(12) United States Patent
Hotta et al.

(10) Patent No.: US 10,637,075 B2
(45) Date of Patent: Apr. 28, 2020

(54) FUEL CELL STACK AND METHOD FOR MANUFACTURING FUEL CELL STACK

(71) Applicant: NGK SPARK PLUG CO., LTD., Nagoya-shi (JP)

(72) Inventors: Nobuyuki Hotta, Konan (JP); Hideki Ishikawa, Ichinomiya (JP); Shunta Ohashi, Komaki (JP); Yasuki Izutsu, Kyoto (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 126 days.

(21) Appl. No.: 15/735,478

(22) PCT Filed: Jun. 7, 2016

(86) PCT No.: PCT/JP2016/066862
§ 371 (c)(1),
(2) Date: Dec. 11, 2017

(87) PCT Pub. No.: WO2016/204017
PCT Pub. Date: Dec. 22, 2016

(65) Prior Publication Data
US 2018/0159148 A1    Jun. 7, 2018

(30) Foreign Application Priority Data
Jun. 15, 2015 (JP) .................. 2015-120343

(51) Int. Cl.
*H01M 8/0271* (2016.01)
*H01M 8/247* (2016.01)
(Continued)

(52) U.S. Cl.
CPC ....... *H01M 8/0271* (2013.01); *H01M 8/0286* (2013.01); *H01M 8/2404* (2016.02);
(Continued)

(58) Field of Classification Search
CPC ...... H01M 8/0271; H01M 8/028; H01M 8/12; H01M 8/2404; H01M 8/247; H01M 2008/1293
See application file for complete search history.

(56) References Cited

U.S. PATENT DOCUMENTS

| 6,689,503 B2 * | 2/2004 | Yang ................... H01M 8/247 417/472 |
| 2005/0147866 A1 | 7/2005 | Ko et al. |

(Continued)

FOREIGN PATENT DOCUMENTS

| JP | 2005-197242 A | 7/2005 |
| JP | 2007-149467 A | 6/2007 |

(Continued)

OTHER PUBLICATIONS

European Search Report dated Nov. 15, 2018 issued by the European Patent Office in Counterpart European Application No. 16811492.4.

(Continued)

*Primary Examiner* — Maria Laios
(74) *Attorney, Agent, or Firm* — Sughrue Mion, PLLC

(57) ABSTRACT

A fuel cell stack including a plurality of electricity generation units fastened by means of a plurality of fastening members. Each electricity generation unit includes a single cell, and a sealing member sandwiched between two other members thereby sealing one of the anode chamber and the cathode chamber. The surface of the sealing member included in at least one electricity generation units, the surface facing either of the two other members, has a surface roughness Ra of 3.0 μm or less.

7 Claims, 15 Drawing Sheets

(51) Int. Cl.
*H01M 8/0286* (2016.01)
*H01M 8/2404* (2016.01)
*H01M 8/12* (2016.01)
*H01M 8/0282* (2016.01)
*H01M 8/124* (2016.01)

(52) U.S. Cl.
CPC .......... *H01M 8/247* (2013.01); *H01M 8/0282* (2013.01); *H01M 8/12* (2013.01); *H01M 2008/1293* (2013.01); *Y02P 70/56* (2015.11)

(56) References Cited

U.S. PATENT DOCUMENTS

| | | | |
|---|---|---|---|
| 2007/0164483 A1* | 7/2007 | Abd Elhamid | B29C 70/58 264/331.11 |
| 2009/0087717 A1 | 4/2009 | Akimoto | |
| 2010/0159362 A1 | 6/2010 | Ito et al. | |
| 2012/0091668 A1 | 4/2012 | Motegi et al. | |
| 2013/0074716 A1 | 3/2013 | Ito et al. | |

FOREIGN PATENT DOCUMENTS

| | | | |
|---|---|---|---|
| JP | 2007149467 A | * | 6/2007 |
| JP | 2007-294184 A | | 11/2007 |
| JP | 2011-086635 A | | 4/2011 |
| JP | 2011-210423 A | | 10/2011 |
| JP | 2013-008706 A | | 1/2013 |
| KR | 10-1161992 B1 | | 7/2012 |
| KR | 10-1417657 B1 | | 7/2014 |

OTHER PUBLICATIONS

Communication dated Jun. 28, 2019, issued by the Korean Intellectual Property Office in corresponding Korean Application No. 10-2017-7035121.
Search Report dated Feb. 15, 2019 by the European Patent Office in counterpart European Patent Application No. 16811492.4.
International Search Report, issued by International Searching Authority in corresponding International Application No. PCT/JP2016/066862, dated Sep. 13, 2016, (PCT/ISA/210).
Written Opinion, issued by International Searching Authority in corresponding International Application No. PCT/JP2016/066862, dated Sep. 13, 2016, (PCT/ISA/237).

* cited by examiner

SURFACE ROUGHNESS Ra

|    | BEFORE POLISHING (μm) | AFTER POLISHING (μm) |
|----|----|----|
| n1 | 3.81 | 2.43 |
| n2 | 3.95 | 2.70 |
| n3 | 3.45 | 1.87 |
| AV | 3.74 | 2.33 |

UNDULATION Pa

|     | BEFORE APPLICATION OF PRELOAD (μm) | AFTER APPLICATION OF PRELOAD (μm) |
|-----|------|------|
| ML1 | 1.75 | 1.35 |
| ML2 | 1.42 | 1.44 |
| ML3 | 2.02 | 1.36 |
| ML4 | 1.41 | 1.39 |
| ML5 | 1.70 | 1.35 |
| AV  | 1.66 | 1.38 |
| σ   | 0.25 | 0.04 |

FUEL CELL STACK AND METHOD FOR MANUFACTURING FUEL CELL STACK

TECHNICAL FIELD

A technique disclosed in the present specification relates to a fuel cell stack.

BACKGROUND ART

In general, a solid oxide fuel cell (hereinafter may be referred to as "SOFC") is used in the form of a fuel cell stack including a plurality of electricity generation units disposed in a predetermined direction (hereinafter may be referred to as a "direction of array"). The fuel cell stack is fastened by means of a plurality of fastening members (e.g., bolts) extending in the direction of array.

The electricity generation unit is the smallest unit of electricity generation, and includes a single cell including an electrolyte layer, a cathode, and an anode such that the cathode and the anode face each other in the direction of array and the electrolyte layer intervenes between these electrodes. The electricity generation unit also includes a sealing member that seals a cathode chamber facing the cathode (see, for example, Patent Document 1). The sealing member is a frame member having a through hole defining the cathode chamber and is formed of, for example, mica. The sealing member is sandwiched between two other members in the direction of array, thereby sealing the cathode chamber. The use of the sealing member achieves sealing of the cathode chamber in a relatively simple manner at low cost.

PRIOR ART DOCUMENT

Patent Document

Patent Document 1: Japanese Patent Application Laid-Open (kokai) No. 2011-210423

SUMMARY OF THE INVENTION

Problem to be Solved by the Invention

The aforementioned conventional technique has a problem in that the sealing member cannot sufficiently prevent leakage of a gas from the cathode chamber, resulting in unsatisfactory sealing performance. Unsatisfactory sealing performance may lead to, for example, leakage of a high-temperature gas and thus reduced heat utilization efficiency, resulting in an undesirable reduction in total efficiency of the fuel cell stack. Such a problem is common not only with a configuration wherein an electricity generation unit includes a sealing member that seals a cathode chamber, but also with a configuration wherein an electricity generation unit includes a sealing member that seals an anode chamber facing an anode. Such a problem is also common with fuel cells other than SOFC.

The present specification discloses a technique capable of solving the aforementioned problems.

Means for Solving the Problem

A technique disclosed in the present specification can be implemented in the following modes.

(1) The present specification discloses a fuel cell stack comprising a plurality of electricity generation units disposed in a first direction; and a plurality of fastening members extending in the first direction, the fuel cell stack being fastened by means of the fastening members and being characterized in that each of the electricity generation units comprises a single cell including an electrolyte layer, and a cathode and an anode which face each other in the first direction with the electrolyte layer intervening therebetween, and a sealing member having a through hole defining one of an anode chamber facing the anode and a cathode chamber facing the cathode, the sealing member being sandwiched between two other members in the first direction, thereby sealing the one of the anode chamber and the cathode chamber; and the surface of the sealing member included in at least one of the electricity generation units, the surface facing either of the two other members, has a surface roughness Ra of 3.0 μm or less. According to the present fuel cell stack, the surface roughness Ra of the sealing member is reduced, whereby the leakage of a gas from the anode chamber or the cathode chamber through the surface of the sealing member can be effectively prevented; i.e., the gas sealing performance of the sealing member can be improved.

(2) The fuel cell stack may be configured such that the surface of the sealing member included in at least one of the electricity generation units, the surface facing either of the two other members, exhibits a standard deviation of undulation Pa of 0.2 or less. According to the present fuel cell stack, a variation in undulation Pa of the sealing member is reduced, whereby the leakage of a gas from the anode chamber or the cathode chamber through the surface of the sealing member can be more effectively prevented; i.e., the gas sealing performance of the sealing member can be further improved.

(3) The fuel cell stack may be configured such that the surface of the sealing member facing either of the two other members has an average undulation Pa of 1.4 μm or less. According to the present fuel cell stack, the undulation Pa of the sealing member is reduced, whereby the leakage of a gas from the anode chamber or the cathode chamber through the surface of the sealing member can be more effectively prevented; i.e., the gas sealing performance of the sealing member can be further improved.

(4) The present specification discloses a method for producing a fuel cell stack comprising a single cell including an electrolyte layer, and a cathode and an anode which face each other in a first direction with the electrolyte layer intervening therebetween; and a sealing member having a through hole defining one of an anode chamber facing the anode and a cathode chamber facing the cathode, the sealing member being sandwiched between two other members in the first direction, thereby sealing the one of the anode chamber and the cathode chamber, the single cell and the sealing member being disposed in the first direction and fastened by means of a plurality of fastening members extending in the first direction, the method being characterized by comprising a compression step of applying a compressive load to the sealing member in the first direction; and an assembly step of fastening a plurality of the single cells and a plurality of the sealing members by means of the plurality of fastening members after the compression step. According to the present method for producing a fuel cell stack, the undulation Pa of the sealing member and a variation in undulation Pa thereof can be reduced. Thus, the porosity of the sealing member can be reduced, and the leakage of a gas from the anode chamber or the cathode chamber through the surface or interior portion of the sealing member can be more effectively prevented; i.e., the gas sealing performance of the sealing member can be further improved.

(5) The method for producing a fuel cell stack may further comprise a thermal treatment step of heating the sealing member before the compression step. According to the present method for producing a fuel cell stack, even if the porosity of the sealing member is increased by the thermal treatment step through decomposition or evaporation of, for example, a binder contained in the sealing member, the porosity can be reduced by the subsequent compression step. Thus, the leakage of a gas from the anode chamber or the cathode chamber through the interior portion of the sealing member can be more effectively prevented.

(6) In the method for producing a fuel cell stack, the compressive load per unit area of the sealing member in the compression step may be greater than the load per unit area applied to the sealing member through fastening of the fuel cell stack by means of the fastening members at the completion of the assembly step. According to the present method for producing a fuel cell stack, the compression step can more effectively reduce the undulation Pa of the sealing member, a variation in undulation Pa thereof, and the porosity thereof. Thus, the leakage of a gas from the anode chamber or the cathode chamber through the surface or interior portion of the sealing member can be more effectively prevented.

The technique disclosed in the present specification can be implemented in various modes; for example, a fuel cell stack, an electricity generation module including the fuel cell stack, a fuel cell system including the electricity generation module, and a production method therefor.

MODES FOR CARRYING OUT THE INVENTION

A. Embodiment

A-1. Structure:
(Structure of Fuel Cell Stack 100)

Figure 1:
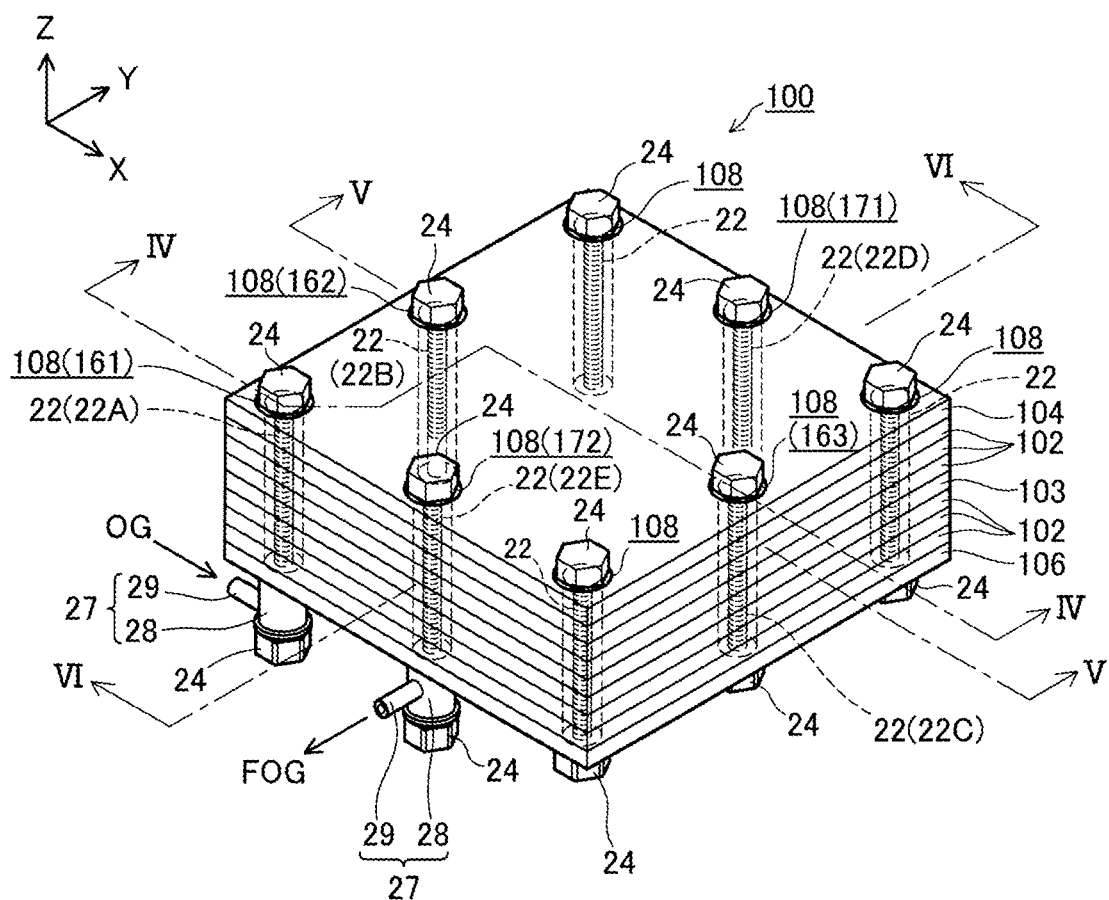
FIG. 1 Perspective view schematically showing the structure of a fuel cell stack 100 according to a first embodiment.
Figure 2:
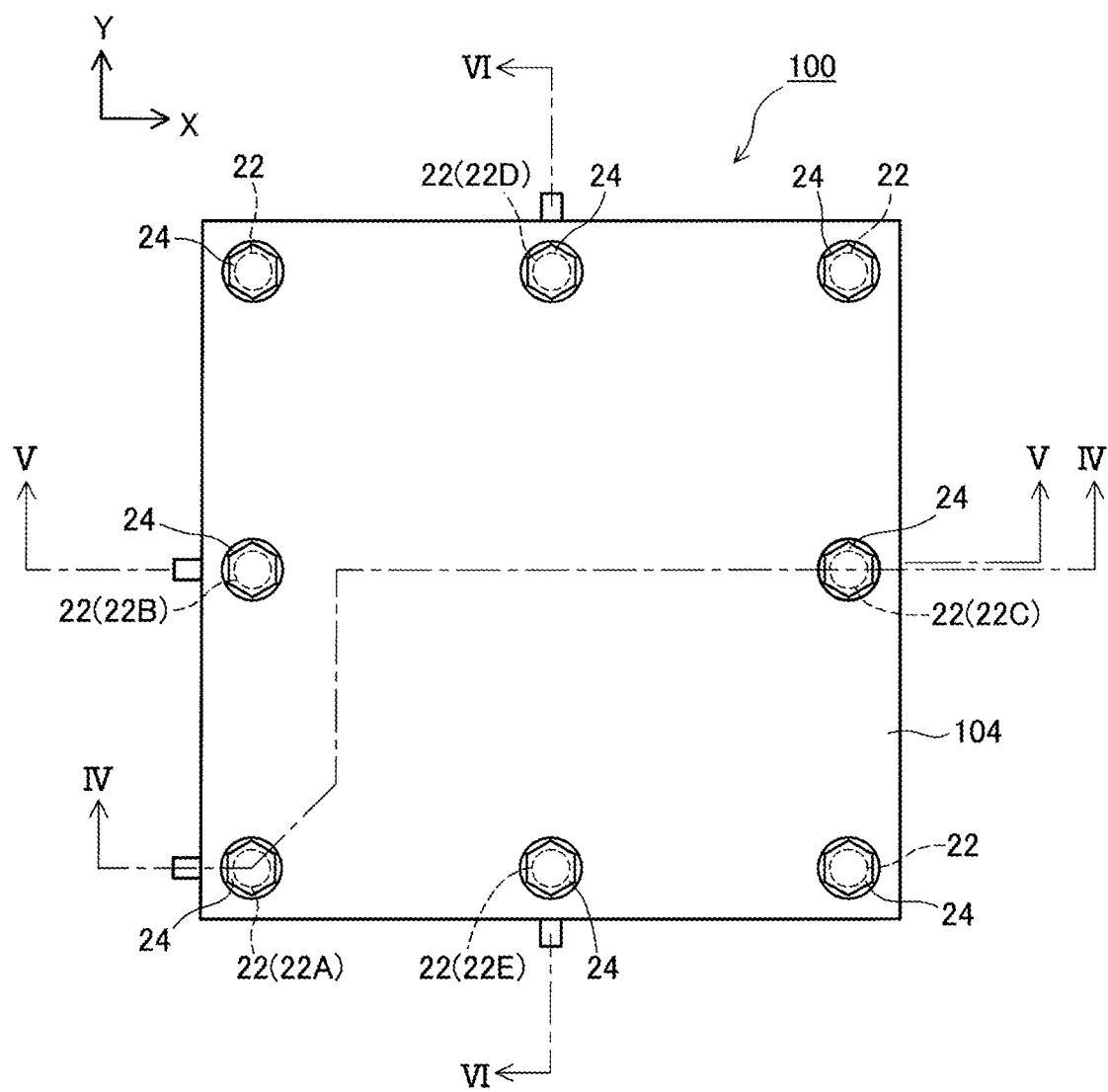
FIG. 2 Explanatory view showing a top XY plane of the fuel cell stack 100 according to the first embodiment.
Figure 3:
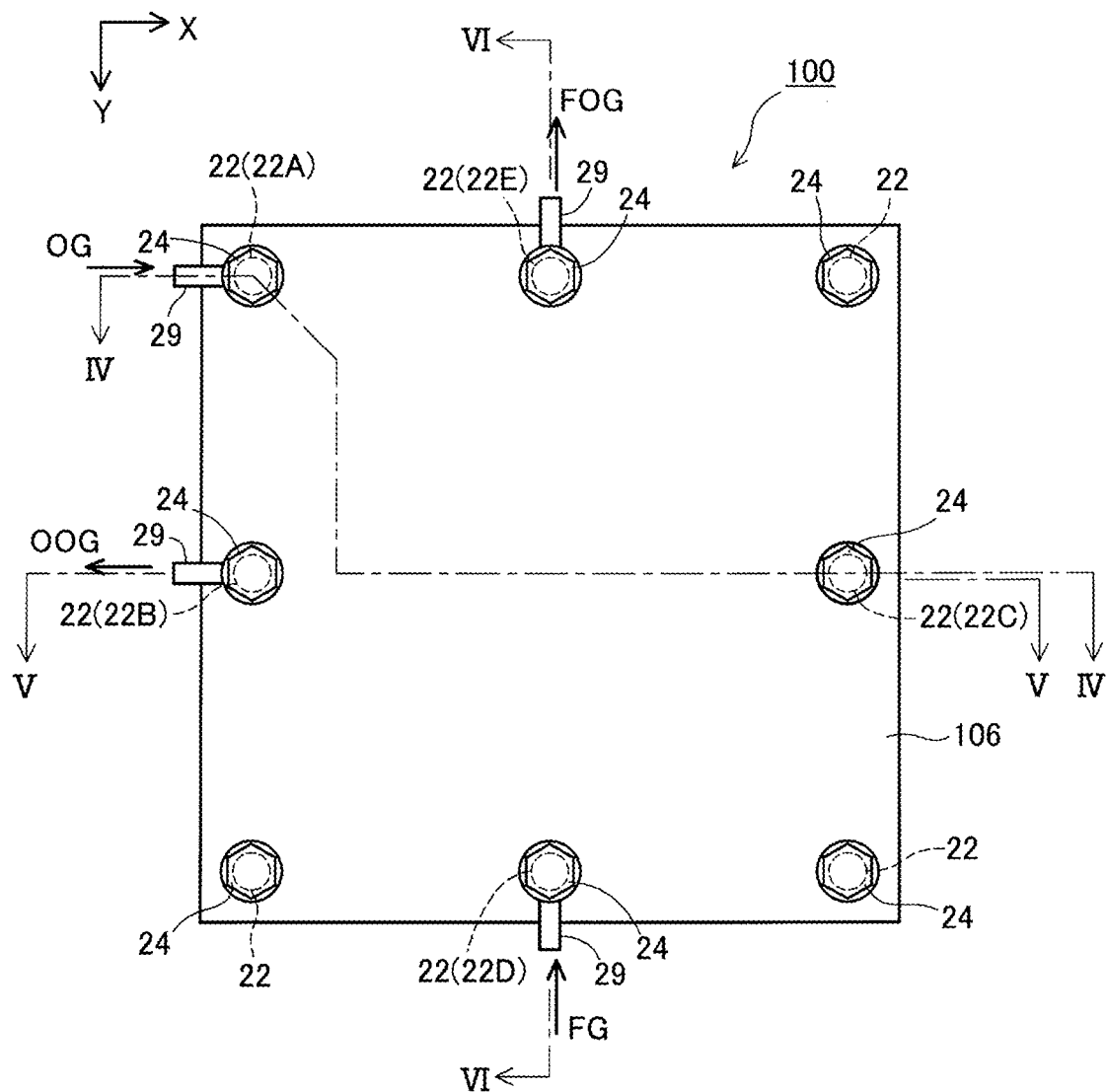
FIG. 3 Explanatory view showing a bottom XY plane of the fuel cell stack 100 according to the first embodiment.
Figure 4:
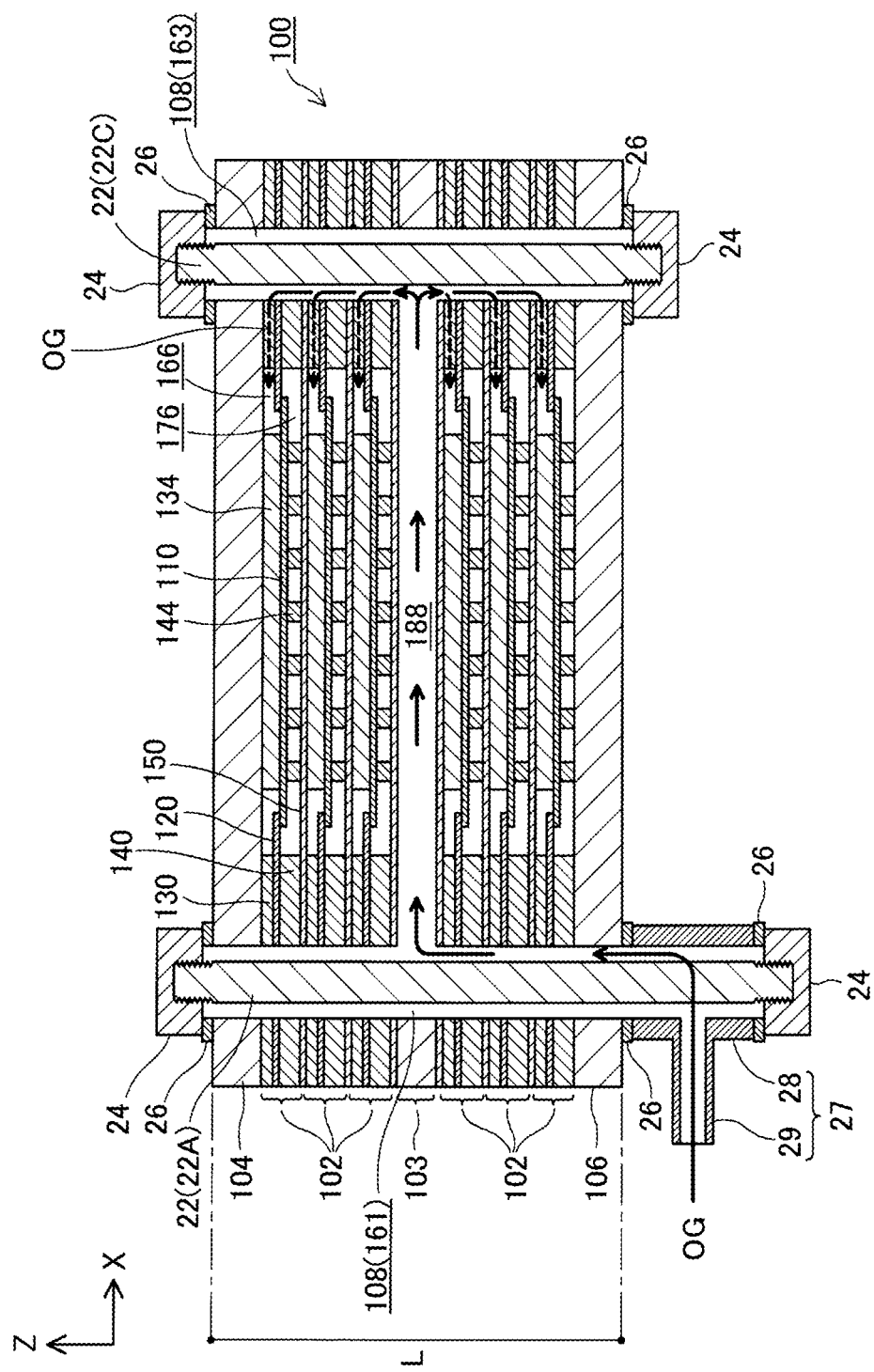
FIG. 4 Explanatory view showing an XZ section of the fuel cell stack 100 taken along line IV-IV of FIGS. 1 to 3.
Figure 5:
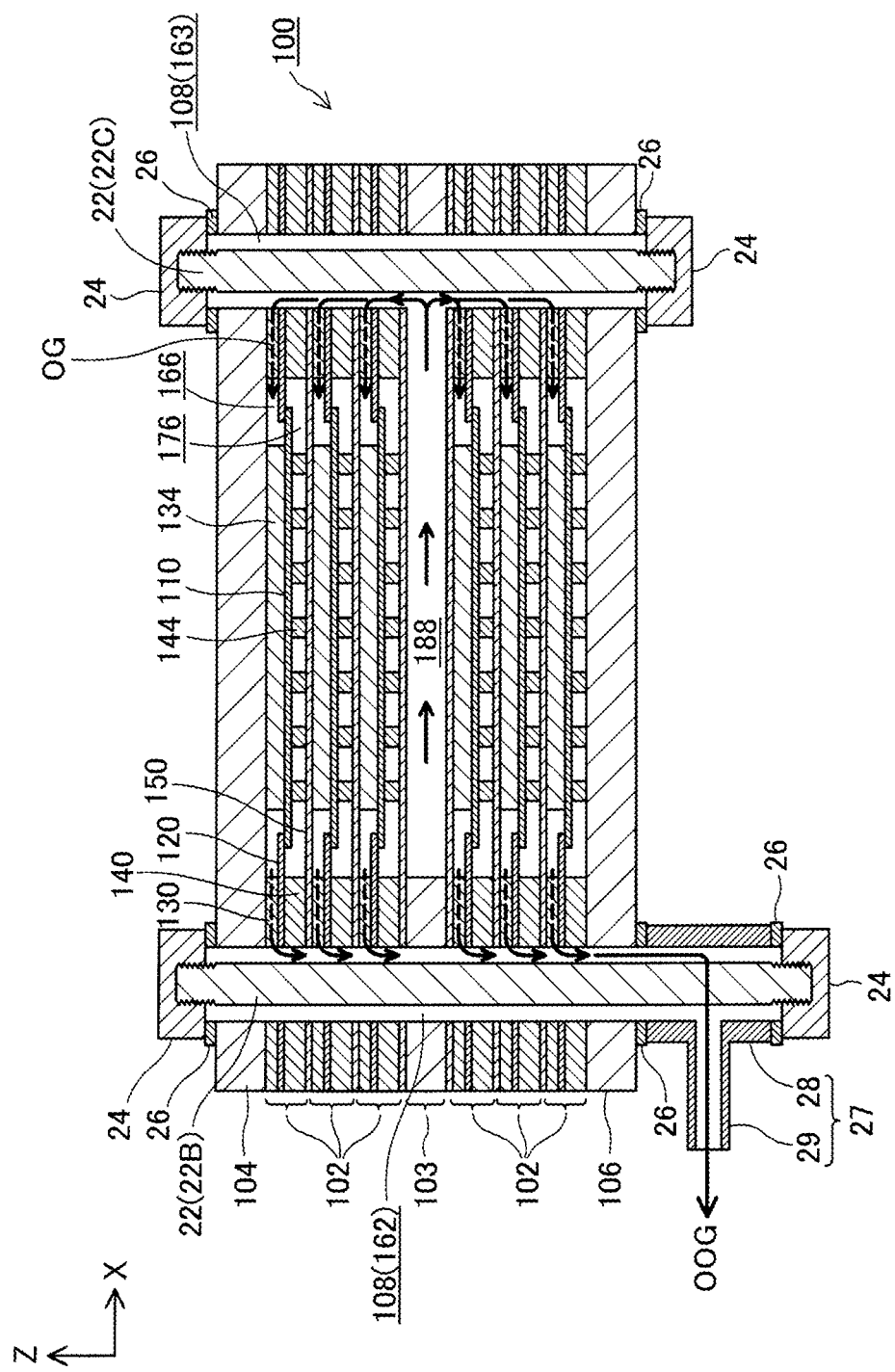
FIG. 5 Explanatory view showing an XZ section of the fuel cell stack 100 taken along line V-V of FIGS. 1 to 3.
Figure 6:
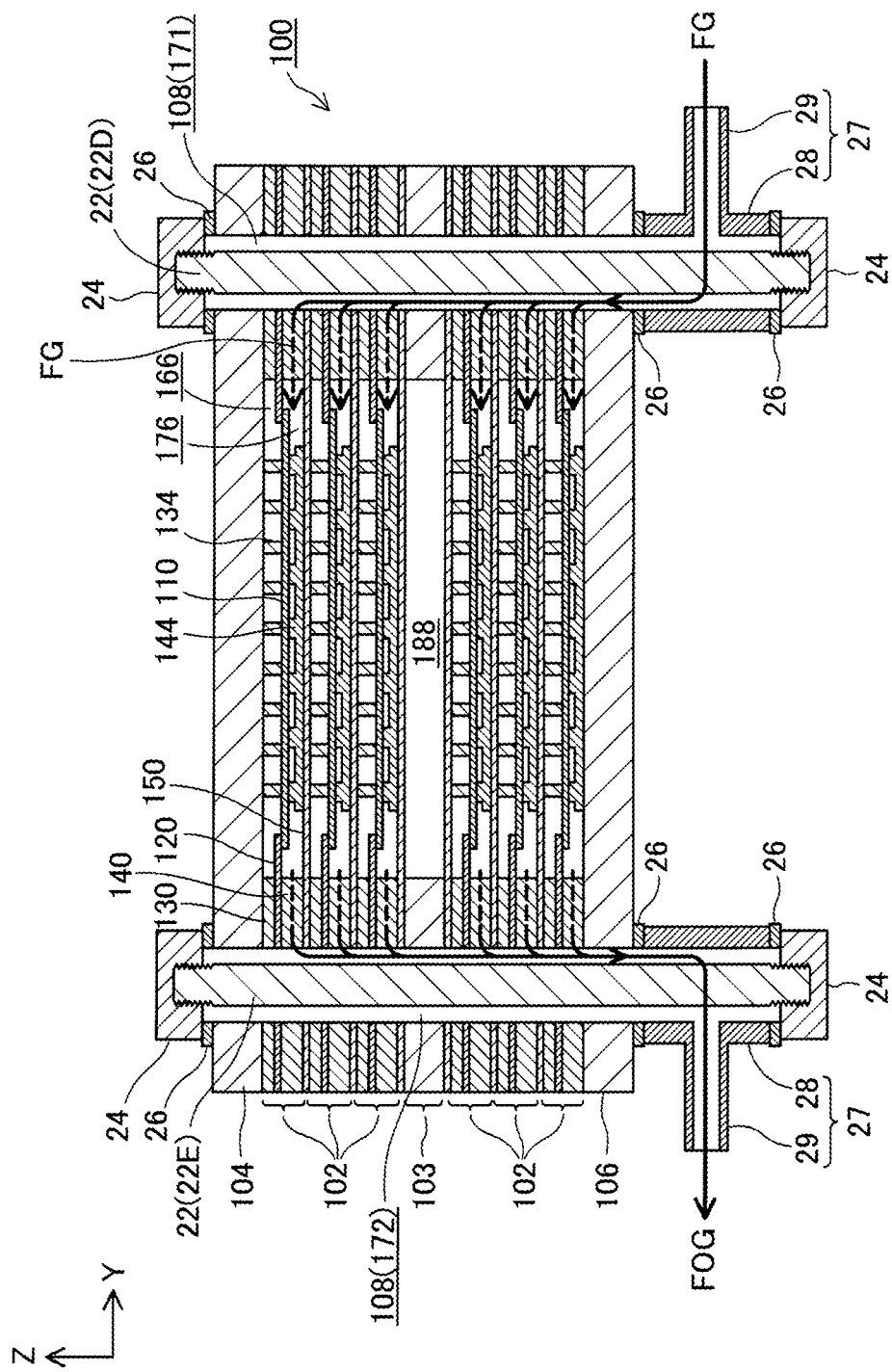
FIG. 6 Explanatory view showing a YZ section of the fuel cell stack 100 taken along line VI-VI of FIGS. 1 to 3.

FIGS. 1 to 6 are explanatory views schematically illustrating the structure of a fuel cell stack 100 according to the present embodiment. FIG. 1 illustrates the external appearance of the fuel cell stack 100; FIG. 2 is a top plan view of the fuel cell stack 100; FIG. 3 is a bottom plan view of the fuel cell stack 100; FIG. 4 is a sectional view of the fuel cell stack 100 taken along line IV-IV of FIGS. 1 to 3; FIG. 5 is a sectional view of the fuel cell stack 100 taken along line V-V of FIGS. 1 to 3; and FIG. 6 is a sectional view of the fuel cell stack 100 taken along line VI-VI of FIGS. 1 to 3. FIGS. 1 to 6 show mutually orthogonal X-axis, Y-axis, and Z-axis for specifying orientation. In the present specification, for the sake of convenience, the positive Z-axis direction is called the upward direction, and the negative Z-axis direction is called the downward direction; however, in actuality, the fuel cell stack 100 may be disposed in a different orientation. The same also applies to FIG. 7 and subsequent drawings.

The fuel cell stack 100 includes a plurality of (six in the present embodiment) of electricity generation units 102, a heat exchange member 103, and a pair of end plates 104 and 106. The six electricity generation units 102 are disposed in a predetermined direction of array (in the vertical direction in the present embodiment). Three electricity generation units 102 (first group) of the six electricity generation units 102 are juxtaposed to one another, and the remaining three electricity generation units 102 (second group) are also juxtaposed to one another. The heat exchange member 103 is disposed between the first group of three electricity generation units 102 and the second group of three electricity generation units 102. That is, the heat exchange member 103 is disposed around the center (in the vertical direction) of an assembly of the six electricity generation units 102 and the heat exchange member 103. The paired end plates 104 and 106 are disposed in such a manner as to sandwich the assembly of the six electricity generation units 102 and the heat exchange member 103 in the vertical direction. The direction of array (vertical direction) corresponds to the first direction appearing in CLAIMS.

The fuel cell stack 100 has a plurality (eight in the present embodiment) of holes formed therein and extending in the vertical direction through peripheral portions about the Z-axis direction of its component layers (the electricity generation units 102, the heat exchange member 103, and the end plates 104 and 106), and the corresponding holes formed in the layers communicated with one another in the vertical direction, thereby forming communication holes 108 extending in the vertical direction from one end plate 104 to the other end plate 106. In the following description, holes formed in the layers of the fuel cell stack 100 for forming the communication holes 108 may also be referred to as "communication holes 108."

Bolts 22 extending in the vertical direction are inserted into the corresponding communication holes 108, and the fuel cell stack 100 is fastened by means of the bolts 22 and nuts 24 engaged with opposite ends of the bolts 22. The bolts 22 correspond to the fastening members appearing in CLAIMS. As shown in FIGS. 4 to 6, corresponding insulation sheets 26 intervene between the nuts 24 engaged with one ends (upper ends) of the bolts 22 and the upper surface of the end plate 104 serving as the upper end of the fuel cell stack 100 and between the nuts 24 engaged with the other ends (lower ends) of the bolts 22 and the lower surface of the end plate 106 serving as the lower end of the fuel cell stack 100. However, in each region where a gas passage member 27, which will be described later, is provided, the gas passage member 27 and the insulation sheets 26 disposed respectively on the upper end and on the lower end of the gas passage member 27 intervene between the nut 24 and the surface of the end plate 106. The insulation sheet 26 is formed of, for example, a mica sheet, a ceramic fiber sheet, a ceramic compact sheet, a glass sheet, or a glass ceramic composite material.

The outside diameter of a shaft portion of each bolt 22 is smaller than the inside diameter of each communication hole 108. Accordingly, a space is secured between the outer circumferential surface of the shaft portion of each bolt 22 and the inner circumferential surface of each communication hole 108. As shown in FIGS. 2 to 4, a space defined by the bolt 22 (bolt 22A) located around one vertex of the perimeter about the Z-axis direction of the fuel cell stack 100 (a vertex on the negative side in the Y-axis direction and on the negative side in the X-axis direction) and the communication hole 108 into which the bolt 22A is inserted functions as an oxidizer gas introduction manifold 161 (gas flow channel) into which oxidizer gas OG is introduced from outside the fuel cell stack 100, whereas a space defined by the bolt 22 (bolt 22C) located around the midpoint of one side of the perimeter about the Z-axis direction of the fuel cell stack 100 (a side on the positive side in the X-axis direction of two sides parallel to the Y-axis) and the communication hole 108 into which the bolt 22C is inserted functions as an oxidizer gas supply manifold 163 (gas flow channel) for supplying the oxidizer gas OG discharged from the heat exchange member 103 to the electricity generation units 102. As shown in FIGS. 2, 3, and 5, a space defined by the bolt 22 (bolt 22B) located around the midpoint of one side of the perimeter about the Z-axis direction of the fuel cell stack 100 (a side on the negative side in the X-axis direction of two sides parallel to the Y-axis) and the communication hole 108 into which the bolt 22B is inserted functions as an oxidizer gas discharge manifold 162 from which oxidizer offgas OOG discharged from the electricity generation units 102 is discharged to the outside of the fuel cell stack 100. In the present embodiment, for example, air is used as the oxidizer gas OG.

As shown in FIGS. 2, 3, and 6, a space defined by the bolt 22 (bolt 22D) located around the midpoint of one side of the perimeter about the Z-axis direction of the fuel cell stack 100 (a side on the positive side in the Y-axis direction of two sides parallel to the X-axis) and the communication hole 108 into which the bolt 22D is inserted functions as an fuel gas introduction manifold 171 into which fuel gas FG is introduced from outside the fuel cell stack 100 and which supplies the fuel gas FG to the electricity generation units 102, whereas a space defined by the bolt 22 (bolt 22E) located around the midpoint of the other side opposite the above side (a side on the negative side in the Y-axis direction of two sides parallel to the X-axis) and the communication hole 108 into which the bolt 22E is inserted functions as a fuel gas discharge manifold 172 from which fuel offgas FOG discharged from the electricity generation units 102 is discharged to the outside of the fuel cell stack 100. In the present embodiment, for example, hydrogen-rich gas reformed from city gas is used as the fuel gas FG.

As shown in FIGS. 4 to 6, the fuel cell stack 100 has four gas passage members 27. Each gas passage member 27 has a tubular body portion 28 and a tubular branch portion 29 branching from the side surface of the body portion 28. The hole of the branch portion 29 communicates with the hole of the body portion 28. A gas pipe (not shown) is connected to the branch portion 29 of each gas passage member 27. As shown in FIG. 4, the hole of the body portion 28 of the gas passage member 27 disposed at the position of the bolt 22A which partially defines the oxidizer gas introduction manifold 161 communicates with the oxidizer gas introduction manifold 161. As shown in FIG. 5, the hole of the body portion 28 of the gas passage member 27 disposed at the position of the bolt 22B which partially defines the oxidizer gas discharge manifold 162 communicates with the oxidizer gas discharge manifold 162. As shown in FIG. 6, the hole of the body portion 28 of the gas passage member 27 disposed at the position of the bolt 22D which partially defines the fuel gas introduction manifold 171 communicates with the fuel gas introduction manifold 171, whereas the hole of the body portion 28 of the gas passage member 27 disposed at the position of the bolt 22E which partially defines the fuel gas discharge manifold 172 communicates with the fuel gas discharge manifold 172.

(Structure of End Plates 104 and 106)

The paired end plates 104 and 106 are electrically conductive members each having a rectangular flat-plate shape and are formed of, for example, stainless steel. One end plate 104 is disposed on the uppermost electricity generation unit 102, and the other end plate 106 is disposed under the lowermost electricity generation unit 102. A plurality of the electricity generation units 102 and the heat exchange member 103 are held under pressure between the two end plates 104 and 106. The upper end plate 104 functions as a positive output terminal of the fuel cell stack 100, and the lower end plate 106 functions as a negative output terminal of the fuel cell stack 100.

(Structure of Electricity Generation Unit 102)

Figure 7:
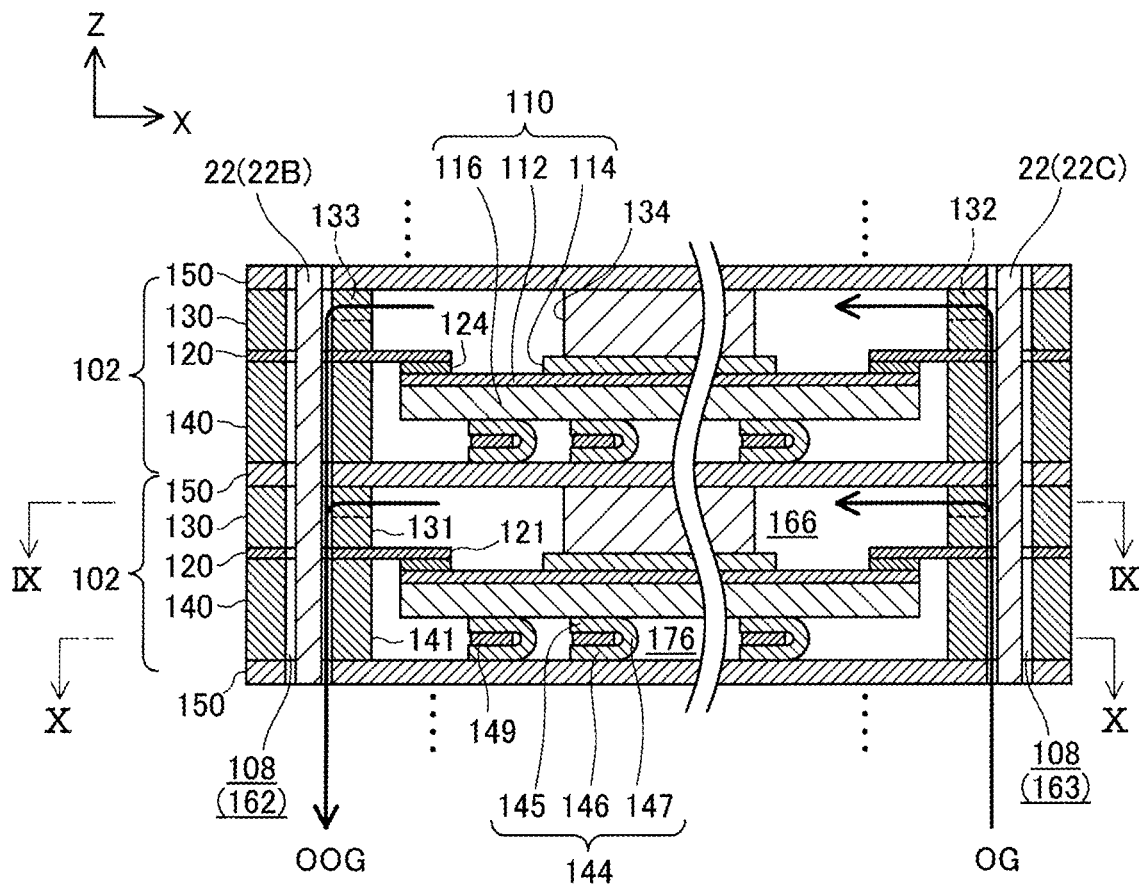
FIG. 7 Explanatory view of the same XZ section as that of FIG. 5, showing two adjacent electricity generation units 102.
Figure 8:
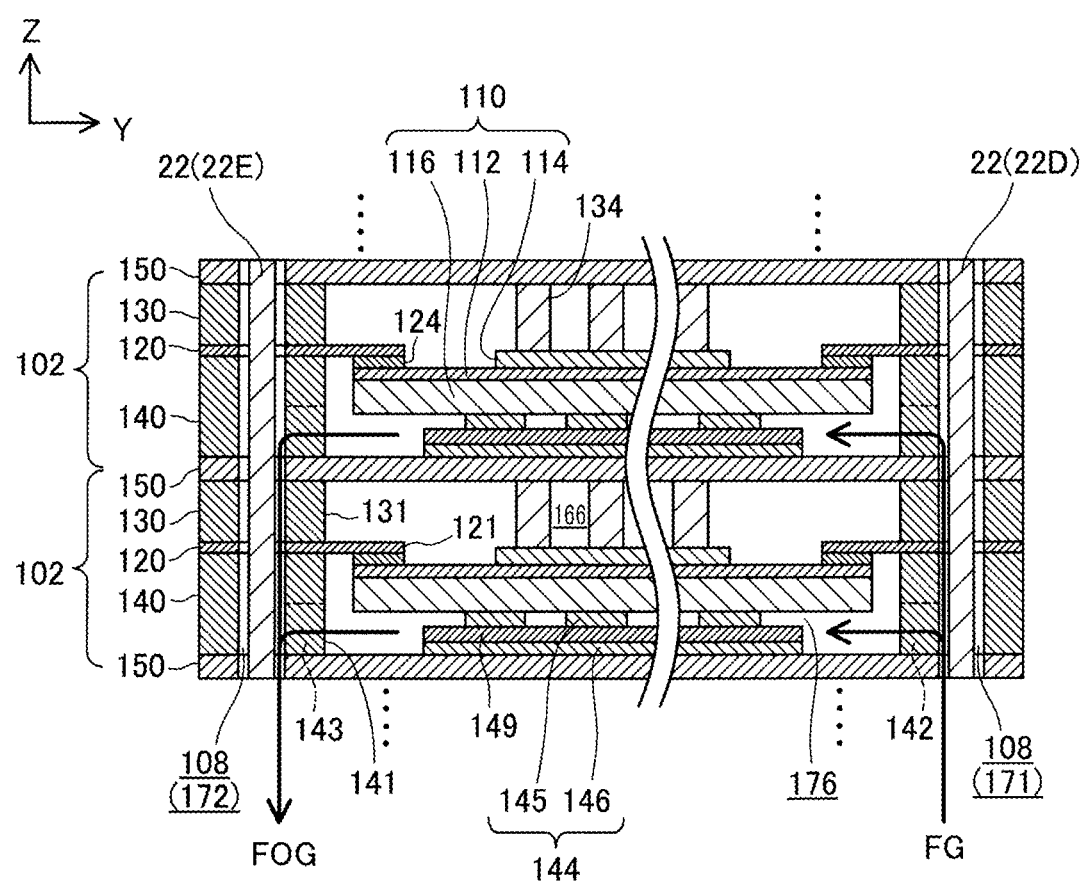
FIG. 8 Explanatory view of the same YZ section as that of FIG. 6, showing two adjacent electricity generation units 102.
Figure 9:
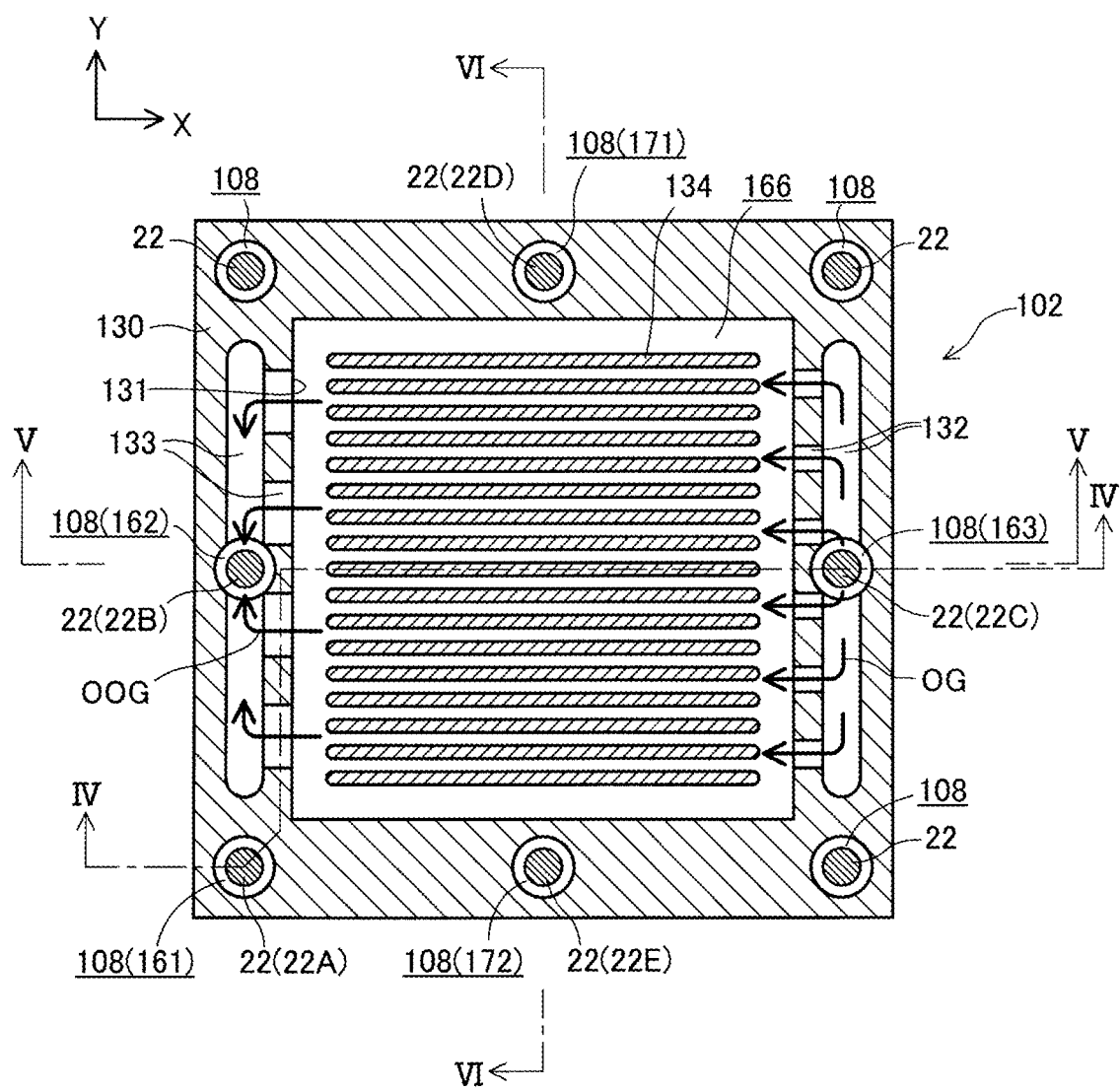
FIG. 9 Explanatory view showing an XY section of the electricity generation unit 102 taken along line IX-IX of FIG. 7.
Figure 10:
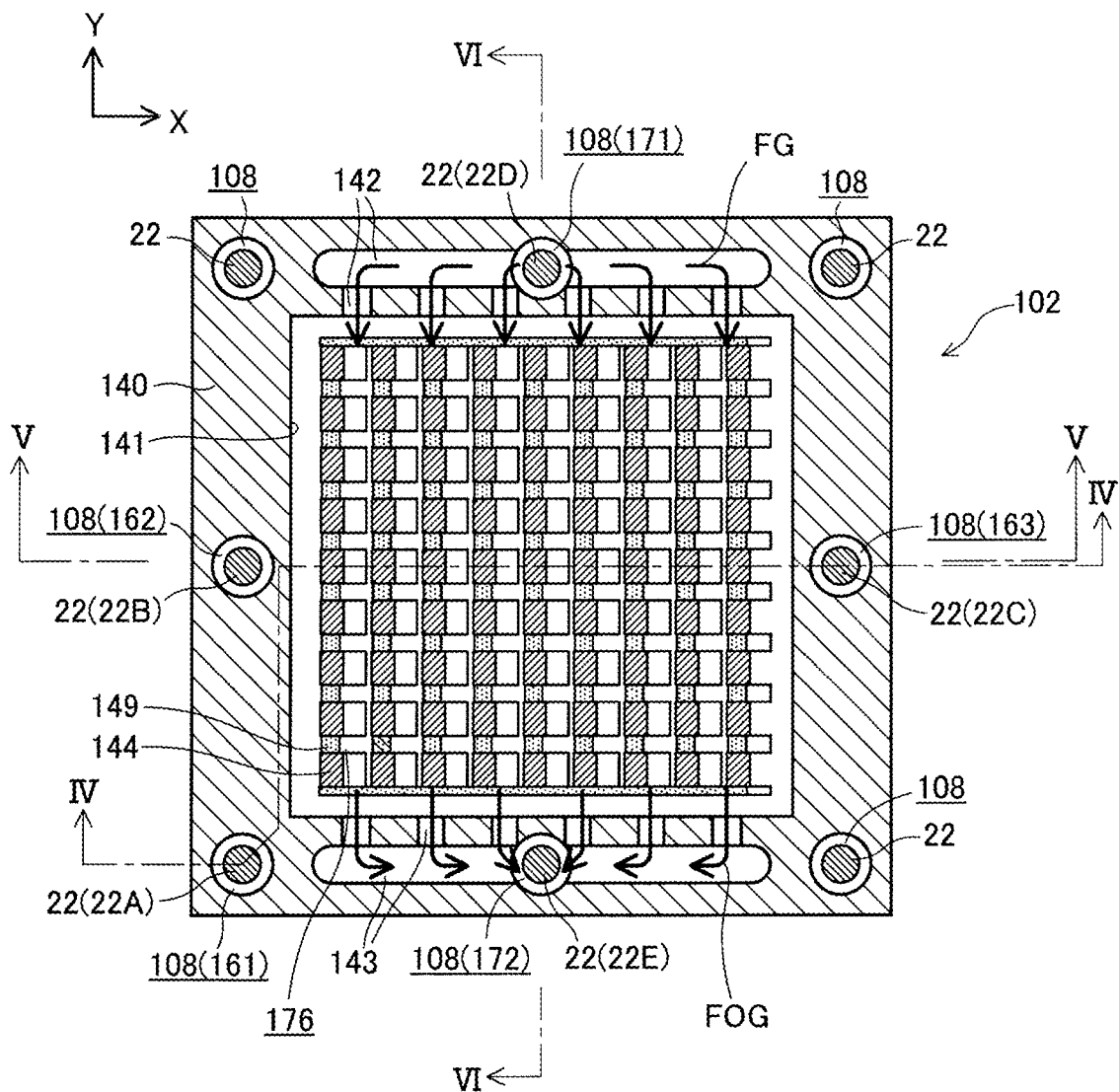
FIG. 10 Explanatory view showing an XY section of the electricity generation unit 102 taken along line X-X of FIG. 7.

FIGS. 7 to 10 are explanatory views illustrating the specific structure of the electricity generation unit 102. FIG. 7 illustrates the same section as that of FIG. 5, showing two adjacent electricity generation units 102; FIG. 8 illustrates the same section as that of FIG. 6, showing two adjacent electricity generation units 102; FIG. 9 illustrates a section of the electricity generation unit 102 taken along line IX-IX of FIG. 7; and FIG. 10 illustrates a section of the electricity generation unit 102 taken along line X-X of FIG. 7.

As shown in FIGS. 7 and 8, the electricity generation unit 102 serving as the smallest unit of electricity generation includes a single cell 110, a separator 120, a cathode-side frame 130, a cathode-side current collector 134, an anode-side frame 140, an anode-side current collector 144, and a pair of interconnectors 150 serving as the uppermost layer and the lowermost layer of the electricity generation unit

102. Holes corresponding to the communication holes 108 into which the bolts 22 are inserted are formed in peripheral portions about the Z-axis direction of the separator 120, the cathode-side frame 130, the anode-side frame 140, and the interconnectors 150.

The interconnector 150 is an electrically conductive member having a rectangular flat-plate shape and is formed of, for example, ferritic stainless steel. The interconnector 150 secures electrical conductivity between the electricity generation units 102 and prevents mixing of reaction gases between the electricity generation units 102. In the present embodiment, two electricity generation units 102 are disposed adjacent to each other, and the two adjacent electricity generation units 102 share one interconnector 150. That is, the upper interconnector 150 of a certain electricity generation unit 102 serves as a lower interconnector 150 of the upper adjacent electricity generation unit 102. Also, since the fuel cell stack 100 has the two end plates 104 and 106, the uppermost electricity generation unit 102 of the fuel cell stack 100 does not have the upper interconnector 150, and the lowermost electricity generation unit 102 does not have the lower interconnector 150 (see FIGS. 4 to 6).

The single cell 110 includes an electrolyte layer 112, and a cathode 114 and an anode 116 which face each other in the vertical direction (direction of array of the electricity generation units 102) with the electrolyte layer 112 intervening therebetween. The single cell 110 of the present embodiment is an anode-support-type single cell in which the anode 116 supports the electrolyte layer 112 and the cathode 114.

The electrolyte layer 112 is a member having a rectangular flat-plate shape and is formed of a solid oxide; for example, YSZ (yttria-stabilized zirconia), ScSZ (scandia-stabilized zirconia), SDC (samarium-doped ceria), GDC (gadolinium-doped ceria), or a perovskite-type oxide. The cathode 114 is a member having a rectangular flat-plate shape and is formed of, for example, a perovskite-type oxide (e.g., LSCF (lanthanum strontium cobalt ferrite), LSM (lanthanum strontium manganese oxide), or LNF (lanthanum nickel ferrite)). The anode 116 is a member having a rectangular flat-plate shape and is formed of, for example, Ni (nickel), a cermet of Ni and ceramic powder, or an Ni-based alloy. Thus, the single cell 110 (electricity generation unit 102) of the present embodiment is a solid oxide fuel cell (SOFC) which uses a solid oxide as an electrolyte.

The separator 120 is a frame member which has a rectangular hole 121 formed in a central region thereof and extending therethrough in the vertical direction, and is formed of, for example, a metal. A portion of the separator 120 around the hole 121 faces a peripheral portion of the surface on the cathode 114 side of the electrolyte layer 112. The separator 120 is bonded to the electrolyte layer 112 (single cell 110) by means of a bonding member 124 formed of a brazing material (e.g., Ag brazing material) and disposed between the facing portion and the electrolyte layer 112. The separator 120 separates the cathode chamber 166 which faces the cathode 114, and the anode chamber 176 which faces the anode 116, from each other, thereby restraining gas leakage from one electrode side to the other electrode side through a peripheral portion of the single cell 110. The single cell 110 to which the separator 120 is bonded is also called a separator-attached single cell.

As shown in FIGS. 7 to 9, the cathode-side frame 130 is a frame-shaped platy member which has an approximately rectangular hole 131 formed in a central region thereof and extending therethrough in the vertical direction. In the present embodiment, the cathode-side frame 130 is formed of mica exhibiting excellent thermal resistance, insulating property, sealing performance, and structural stability. The hole 131 of the cathode-side frame 130 defines the cathode chamber 166 which faces the cathode 114. The cathode-side frame 130 is in contact with a peripheral portion of the surface on the side opposite the electrolyte layer 112 of the separator 120 and with a peripheral portion of the surface on the side toward the cathode 114 of the interconnector 150. That is, the cathode-side frame 130 is sandwiched between the separator 120 and the interconnector 150. Thus, the cathode-side frame 130 achieves the sealing (compression sealing) of the cathode chamber 166. The cathode-side frame 130 also achieves the electrical insulation between the paired interconnectors 150 included in the electricity generation unit 102. The cathode-side frame 130 has an oxidizer gas supply communication hole 132 formed therein and adapted to establish communication between the oxidizer gas supply manifold 163 and the cathode chamber 166, and an oxidizer gas discharge communication hole 133 formed therein and adapted to establish communication between the cathode chamber 166 and the oxidizer gas discharge manifold 162. The cathode-side frame 130 corresponds to the sealing member appearing in CLAIMS, and the hole 131 corresponds to the through hole appearing in CLAIMS.

As shown in FIGS. 7, 8, and 10, the anode-side frame 140 is a frame member which has a rectangular hole 141 formed in a central region thereof and extending therethrough in the vertical direction, and is formed of, for example, a metal. The hole 141 of the anode-side frame 140 partially constitutes the anode chamber 176 which faces the anode 116. The anode-side frame 140 is in contact with a peripheral portion of the surface on the side toward the electrolyte layer 112 of the separator 120 and with a peripheral portion of the surface on the side toward the anode 116 of the interconnector 150. The anode-side frame 140 has a fuel gas supply communication hole 142 formed therein and adapted to establish communication between the fuel gas introduction manifold 171 and the anode chamber 176, and a fuel gas discharge communication hole 143 formed therein and adapted to establish communication between the anode chamber 176 and the fuel gas discharge manifold 172.

As shown in FIGS. 7 to 9, the cathode-side current collector 134 is disposed within the cathode chamber 166. The cathode-side current collector 134 is composed of a plurality of rectangular columnar conductive members disposed at predetermined intervals, and is formed of, for example, ferritic stainless steel. The cathode-side current collector 134 is in contact with the surface on the side opposite the electrolyte layer 112 of the cathode 114 and with the surface on the side toward the cathode 114 of the interconnector 150. Thus, the cathode-side current collector 134 electrically connects the cathode 114 to the interconnector 150. The cathode-side current collector 134 and the interconnector 150 may be in the form of a unitary member.

As shown in FIGS. 7, 8, and 10, the anode-side current collector 144 is disposed within the anode chamber 176. The anode-side current collector 144 includes an interconnector facing portion 146, a plurality of electrode facing portions 145, and a connection portion 147 which connects each electrode facing portion 145 to the interconnector facing portion 146. The anode-side current collector 144 is formed of, for example, nickel, a nickel alloy, or stainless steel. Each electrode facing portion 145 is in contact with the surface on the side opposite the electrolyte layer 112 of the anode 116, and the interconnector facing portion 146 is in contact with the surface on the side toward the anode 116 of the interconnector 150. Thus, the anode-side current collector 144 electrically connects the anode 116 to the interconnector 150. A spacer 149 formed of, for example, mica is disposed between the electrode facing portion 145 and the interconnector facing portion 146. Therefore, the anode-side current collector 144 follows the deformation of the electricity generation unit 102 stemming from a temperature cycle and a pressure variation of reaction gas, thereby maintaining good electrical connection between the anode 116 and the interconnector 150 via the anode-side current collector 144.

(Structure of Heat Exchange Member 103)

Figure 11:
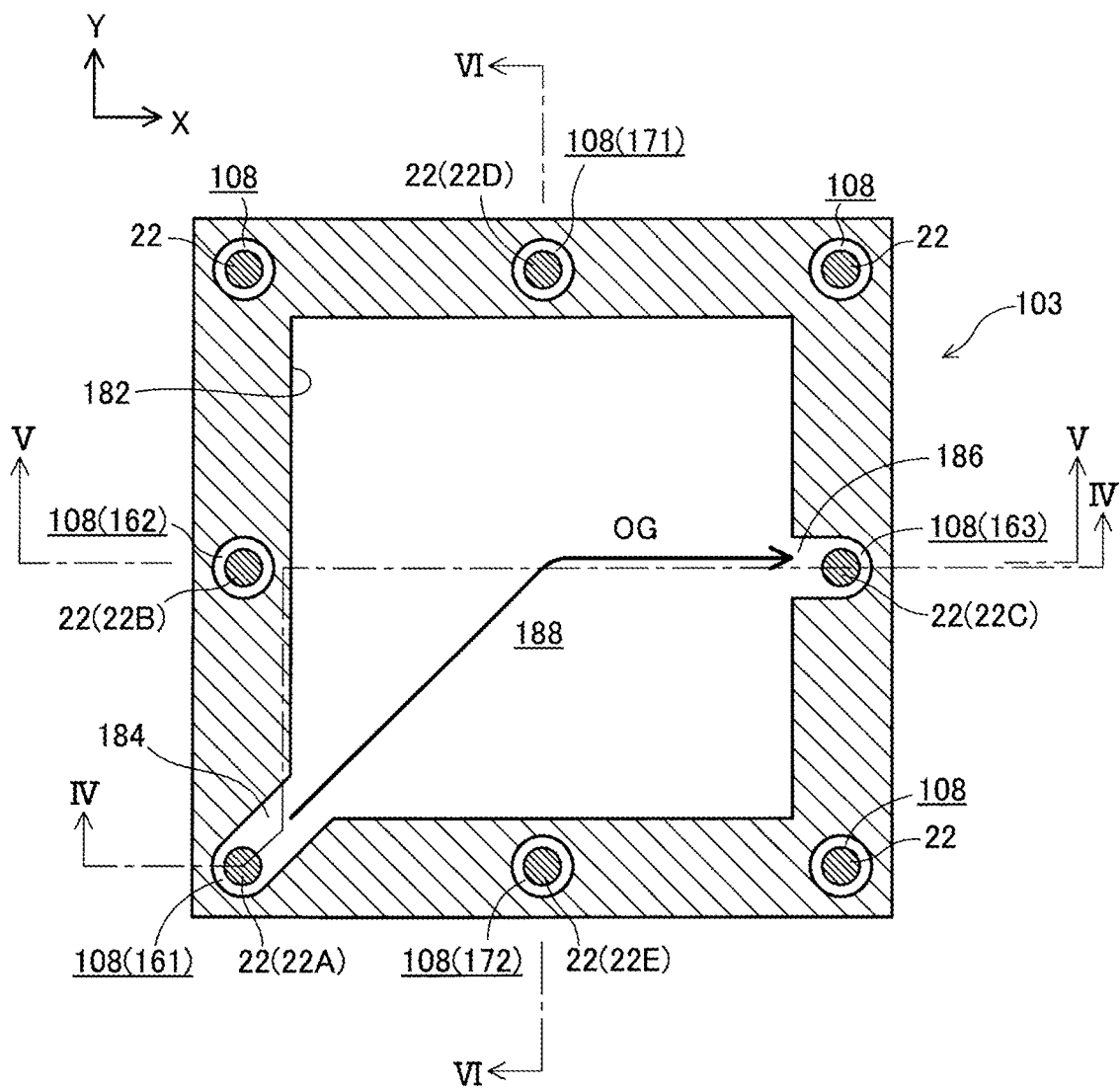
FIG. 11 Explanatory view schematically showing an XY section of a heat exchange member 103.

FIG. 11 is an explanatory view schematically illustrating a cross section of the heat exchange member 103. FIG. 11 illustrates a cross section of the heat exchange member 103 in the direction perpendicular to the direction of array. As shown in FIGS. 4 to 6 and 11, the heat exchange member 103 is a member having a rectangular flat-plate shape and is formed of, for example, ferritic stainless steel. The heat exchange member 103 also has a hole 182 formed in a central region thereof and extending therethrough in the vertical direction. The heat exchange member 103 also has a communication hole 184 adapted to establish communication between the central hole 182 and the communication hole 108 forming the oxidizer gas introduction manifold 161, and a communication hole 186 adapted to establish communication between the central hole 182 and the communication hole 108 forming the oxidizer gas supply manifold 163. The heat exchange member 103 is sandwiched between the lower interconnector 150 contained in the electricity generation unit 102 upwardly adjacent to the heat exchange member 103 and the upper interconnector 150 contained in the electricity generation unit 102 downwardly adjacent to the heat exchange member 103. A space formed between these interconnectors 150 by the hole 182 and the communication holes 184 and 186 functions as a heat exchange flow channel 188 through which the oxidizer gas OG flows for heat exchange as described below.

A-2. Operation of Fuel Cell Stack 100:

As shown in FIG. 4, when the oxidizer gas OG is supplied through a gas pipe (not shown) connected to the branch portion 29 of the gas passage member 27 provided at the position of the oxidizer gas introduction manifold 161, the oxidizer gas OG is supplied to the oxidizer gas introduction manifold 161 through the holes of the branch portion 29 and the body portion 28 of the gas passage member 27. As shown in FIGS. 4 and 11, the oxidizer gas OG supplied to the oxidizer gas introduction manifold 161 flows into the heat exchange flow channel 188 formed in the heat exchange member 103 and then is discharged to the oxidizer gas supply manifold 163 through the heat exchange flow channel 188. The heat exchange member 103 is upwardly and downwardly adjacent to the electricity generation unit 102. As described below, the electricity generating reaction in the electricity generation unit 102 is an exothermic reaction. Thus, when the oxidizer gas OG flows through the heat exchange flow channel 188 in the heat exchange member 103, heat exchange occurs between the oxidizer gas OG and the electricity generation unit 102, resulting in an increase in the temperature of the oxidizer gas OG. Since the oxidizer gas introduction manifold 161 does not communicate with the cathode chambers 166 of the electricity generation units 102, the oxidizer gas OG is not supplied from the oxidizer gas introduction manifold 161 to the cathode chambers 166 of the electricity generation units 102. As shown in FIGS. 4, 5, 7, and 9, the oxidizer gas OG discharged to the oxidizer gas supply manifold 163 is supplied from the oxidizer gas supply manifold 163 to the cathode chambers 166 through the oxidizer gas supply communication holes 132 of the electricity generation units 102.

As shown in FIGS. 6, 8, and 10, when the fuel gas FG is supplied through a gas pipe (not shown) connected to the branch portion 29 of the gas passage member 27 provided at the position of the fuel gas introduction manifold 171, the fuel gas FG is supplied to the fuel gas introduction manifold 171 through the holes of the branch portion 29 and the body portion 28 of the gas passage member 27 and is then supplied from the fuel gas introduction manifold 171 to the anode chambers 176 through the fuel gas supply communication holes 142 of the electricity generation units 102.

When the oxidizer gas OG is supplied to the cathode chamber 166 of each electricity generation unit 102, whereas the fuel gas FG is supplied to the anode chamber 176 of each electricity generation unit 102, the single cell 110 generates electricity through the electrochemical reaction between the oxidizer gas OG and the fuel gas FG. The electricity generating reaction is an exothermic reaction. In each electricity generation unit 102, the cathode 114 of the single cell 110 is electrically connected to one interconnector 150 through the cathode-side current collector 134, whereas the anode 116 is electrically connected to the other interconnector 150 through the anode-side current collector 144. Also, a plurality of the electricity generation units 102 contained in the fuel cell stack 100 are connected electrically in series via the heat exchange member 103. Accordingly, electric energy generated in the electricity generation units 102 is output from the end plates 104 and 106 which function as output terminals of the fuel cell stack 100. Notably, in the SOFC, since electricity is generated at a relatively high temperature (e.g., 700° C. to 1,000° C.), the fuel cell stack 100 may be heated by a heater (not shown) from startup till the high temperature can be maintained by means of heat generated as a result of generation of electricity.

As shown in FIGS. 5, 7, and 9, the oxidizer offgas OOG discharged from the cathode chambers 166 of the electricity generation units 102 is discharged to the oxidizer gas discharge manifold 162 through the oxidizer gas discharge communication holes 133, passes through the holes of the body portion 28 and the branch portion 29 of the gas passage member 27 provided at the position of the oxidizer gas discharge manifold 162, and is then discharged to the outside of the fuel cell stack 100 through a gas pipe (not shown) connected to the branch portion 29. Also, as shown in FIGS. 6, 8, and 10, the fuel offgas FOG discharged from the anode chambers 176 of the electricity generation units 102 is discharged to the fuel gas discharge manifold 172 through the fuel gas discharge communication holes 143, passes through the holes of the body portion 28 and the branch portion 29 of the gas passage member 27 provided at the position of the fuel gas discharge manifold 172, and is then discharged to the outside of the fuel cell stack 100 through a gas pipe (not shown) connected to the branch portion 29.

Figure 12:
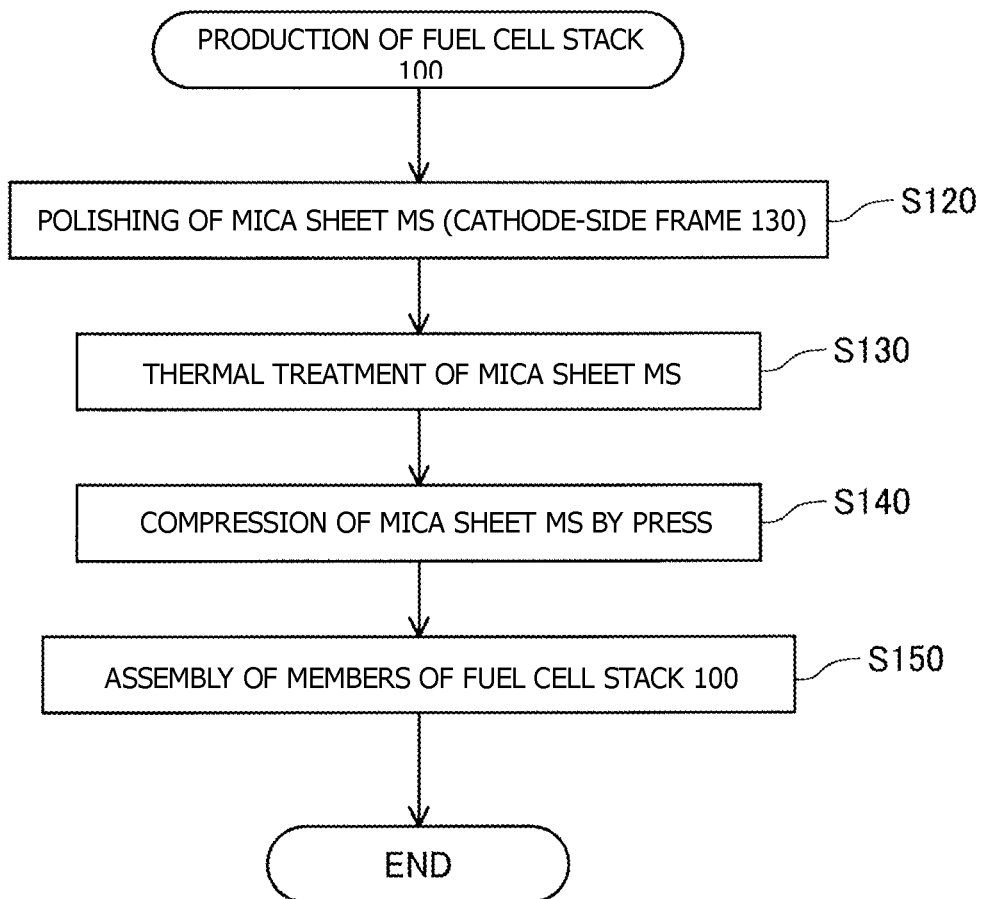
FIG. 12 Flowchart showing a method for producing the fuel cell stack 100 according to the present embodiment.

A-3. Method for Producing Fuel Cell Stack 100:

FIG. 12 is a flowchart showing a method for producing the fuel cell stack 100 according to the present embodiment. Firstly, the surface of a platy mica sheet MS, which is a material for forming the cathode-side frame 130, is polished (S120). This polishing step is performed by, for example, passing the mica sheet MS between two rollers each having polishing paper wound around the surface thereof. The polishing step reduces the degree of fine irregularities on both surfaces of the mica sheet MS, thereby reducing the surface roughness Ra.

Figures 13, 14:
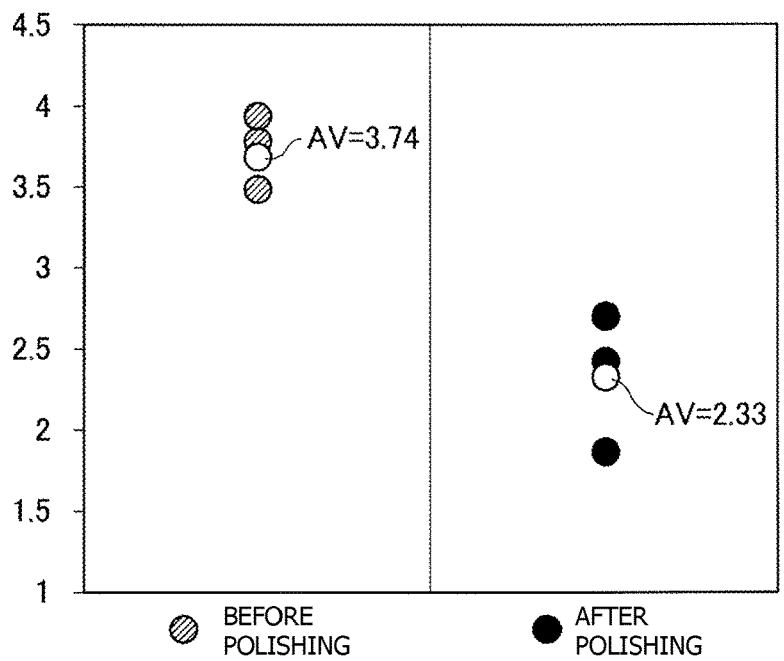
FIG. 13 Explanatory view showing an example of the results of measurement of the surface roughness Ra of a mica sheet MS.
FIG. 14 Explanatory view showing an example of the results of measurement of the undulation Pa of the mica sheet MS.

FIG. 13 is an explanatory view showing an example of the results of measurement of the surface roughness Ra of the mica sheet MS. FIG. 13 illustrates the surface roughnesses Ra of three mica sheets MS (samples n1 to n3) measured before and after the polishing step (S120 in FIG. 12). Before the polishing step, all the samples had a surface roughness Ra of more than 3.0 (μm), and the average surface roughness Ra (AV) of the three samples was 3.74 (μm). After the polishing step, all the samples had a surface roughness Ra of 3.0 (μm) or less, and the average surface roughness Ra (AV) of the three samples was 2.33 (μm). Thus, the polishing step reduces the surface roughness Ra of the mica sheet MS to 3.0 (μm) or less.

The surface roughness Ra of the mica sheet MS is as defined by JIS B 0601:2013. The surface roughness Ra of the mica sheet MS is measured by means of a stylus-type device as specified in JIS B 0633:2001. In order to measure the surface roughness Ra of the mica sheet MS (cathode-side frame 130) included in the assembled fuel cell stack 100, the mica sheet MS must be removed through release of the fastening of the fuel cell stack 100 by means of the bolts 22. In this case, if the mica sheet MS can be solely removed, the surface roughness Ra of the mica sheet MS is measured by means of a stylus-type device. In contrast, if the mica sheet MS is bonded to another component (e.g., the separator 120 or the interconnector 150) and cannot be separated, a cross section including the mica sheet MS and the bonded component is imaged, and the cross-sectional image is analyzed to thereby prepare a cross-sectional curve. The surface roughness Ra of the mica sheet MS is calculated on the basis of the resultant cross-sectional curve as specified in JIS B 0601:2013.

After the polishing step, the mica sheet MS is subjected to thermal treatment (S130 in FIG. 12). In the present embodiment, the thermal treatment was performed by placing the mica sheet MS in air at 850° C. for five hours. This thermal treatment is performed mainly for the purpose of evaporating a binder (adhesive) for forming mica into a sheet, thereby removing contaminants contained in the binder. The thermal treatment evaporates the binder contained in the mica sheet MS, resulting in an increase in porosity of the mica sheet MS.

After the thermal treatment, the mica sheet MS is compressed by means of a press (S140 in FIG. 12). In the present embodiment, a compressive load is provided in this compression step so that a pressure of about 80 MPa to 100 MPa is applied to the mica sheet MS. In the present specification, the compressive load applied to the mica sheet MS in the compression step may be referred to as "preload" for distinguishing from the compressive load (hereinafter may be referred to as "fastening load") acting on the mica sheet MS (cathode-side frame 130) after fastening of the fuel cell stack 100 by means of the bolts 22. In the present embodiment, the fastening load is about 5 MPa to 15 MPa. Thus, the preload is considerably greater than the fastening load. The compression step improves the flatness of the mica sheet MS, thereby reducing the undulation Pa of the mica sheet MS and a variation in undulation Pa. Furthermore, the compression step eliminates pores in the mica sheet MS, resulting in a reduction in porosity. The compression step barely affects the surface roughness Ra of the mica sheet MS.

FIG. 14 is an explanatory view showing the results of measurement of the undulation Pa of the mica sheet MS. FIG. 14 illustrates the undulations Pa of a mica sheet MS sample measured, before and after application of a preload of 80 MPa in the compression step (S140 in FIG. 12), along five straight measurement lines ML1 to ML5 set on the mica sheet MS sample. Before the compression step, all the undulations Pa measured along the measurement lines ML were greater than 1.4 (μm), and the average (AV) of the undulations Pa measured along the measurement lines ML was 1.66 (μm) (standard deviation (σ): 0.25). In contrast, after the compression step, all the undulations Pa measured along the measurement lines ML (exclusive of the measurement line ML2) were 1.4 (μm) or less, and the average (AV) of the undulations Pa measured along the measurement lines ML was 1.38 (μm) (standard deviation (σ): 0.04). Thus, the application of a preload to the mica sheet MS reduces the undulation Pa of the mica sheet MS and considerably reduces a variation in undulation Pa.

The undulation Pa of the mica sheet MS is as defined by JIS B 0601:2013. The undulation Pa of the mica sheet MS is measured by means of a stylus-type device as described in JIS B 0633:2001.

After the compression step, the components (including the mica sheet MS) of the fuel cell stack 100 are assembled (S150 in FIG. 12). The fuel cell stack 100 having the aforementioned configuration is produced through the steps described above.

Figure 15:
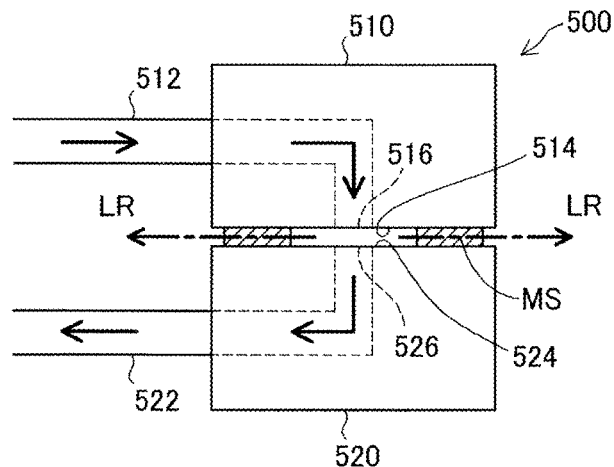
FIG. 15 Explanatory view showing the structure of a test apparatus 500 used for performance evaluation.
Figure 16:
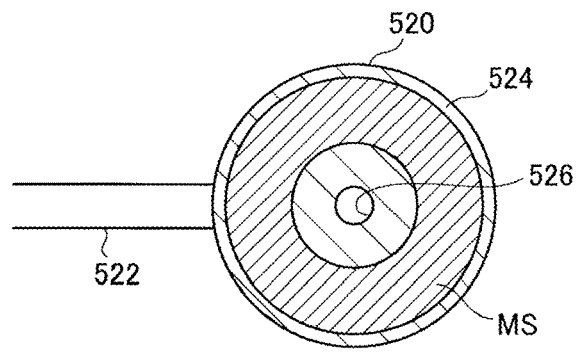
FIG. 16 Explanatory view showing the structure of the test apparatus 500 used for performance evaluation.
Figure 17:
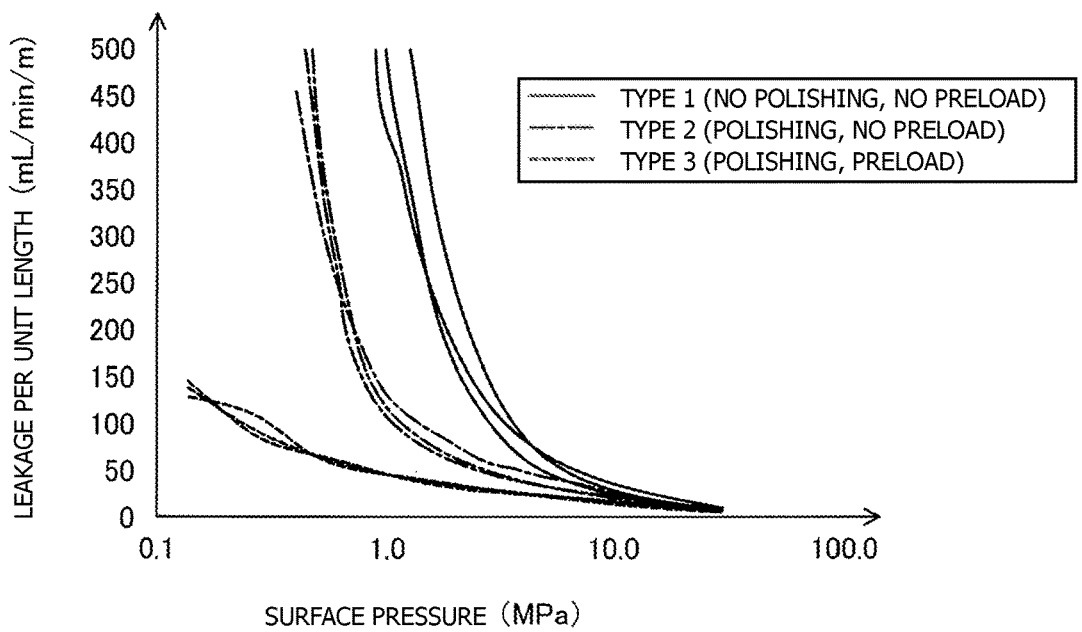
FIG. 17 Explanatory view showing an example of the results of performance evaluation.

A-4. Performance Evaluation of Cathode-Side Frame 130 (Mica Sheet MS):

The cathode-side frame 130 (mica sheet MS) included in the fuel cell stack 100 produced by the aforementioned method was evaluated for its gas sealing performance. FIGS. 15 and 16 are explanatory views showing the structure of a test apparatus 500 used for the performance evaluation. FIG. 17 is an explanatory view showing the results of the performance evaluation.

As shown in FIGS. 15 and 16, the performance evaluation was performed by use of a test apparatus 500 including a first jig 510 having an approximately circular surface 514 and a second jig 520 having an approximately circular surface 524. The surface 514 of the first jig 510 has an opening 516, and a gas supply tube 512 is connected to the opening 516. The surface 524 of the second jig 520 has an opening 526, and a gas discharge tube 522 is connected to the opening 526.

In the performance evaluation, the mica sheet MS having a ring-like shape in plan view is sandwiched between the surface 514 of the first jig 510 and the surface 524 of the second jig 520 to form a space in a hollow portion of the mica sheet MS so that a gas is supplied to the space from the gas supply tube 512 through the opening 516 and the gas is discharged from the space to the gas discharge tube 522 through the opening 526. The flow rate of the gas in the gas supply tube 512 and the flow rate of the gas in the gas discharge tube 522 were measured, and the difference between these flow rates was calculated as the amount of gas leakage from the space via a leakage route LR through the surface or interior portion of the mica sheet MS. The flow rate of the gas in the gas supply tube 512 was adjusted to 100 mL/min, and the back pressure was adjusted to 10 kPa. The width (sealing width) of the mica sheet MS perpendicular to the circumferential direction thereof was adjusted to 5 mm.

As shown in FIG. 17, the performance evaluation was performed by use of the following three types of mica sheets MS: an unpolished mica sheet MS without application of a preload (type 1); a polished mica sheet MS without application of a preload (type 2); and a polished mica sheet MS with application of a preload (type 3). Three samples of each type were examined for the amount of gas leakage per unit length (inner perimeter) of the mica sheet MS (mL/min/m) while varying the surface pressure applied to the mica sheet MS. The mica sheet MS of type 1 had a surface roughness Ra of 3.7 (μm), and the mica sheet MS of type 2 or 3 had a surface roughness Ra of 2.3 (μm). The preload was adjusted to 80 MPa.

As shown in FIG. 17, in general, a decrease in surface pressure applied to the mica sheet MS leads to a reduction in gas sealing performance. Regardless of the surface pressure, the gas sealing performance of the mica sheet MS of type 2 is higher than that of the mica sheet MS of type 1. This is probably attributed to the fact that the polishing of the mica sheet MS reduces the surface roughness Ra, resulting in reduced gas leakage through the surface of the mica sheet MS. The polishing of the mica sheet MS also reduces a variation in gas sealing performance between samples.

Regardless of the surface pressure, the gas sealing performance of the mica sheet MS of type 3 is higher than that of the mica sheet MS of type 2. This is probably attributed to the fact that the application of a preload to the mica sheet MS reduces the undulation Pa, resulting in reduced gas leakage through the surface of the mica sheet MS, and the fact that the application of a preload to the mica sheet MS reduces the porosity of the mica sheet MS, resulting in reduced gas leakage through the interior portion of the mica sheet MS. Also, the application of a preload to the mica sheet MS further reduces a variation in gas sealing performance among samples.

Figure 18:
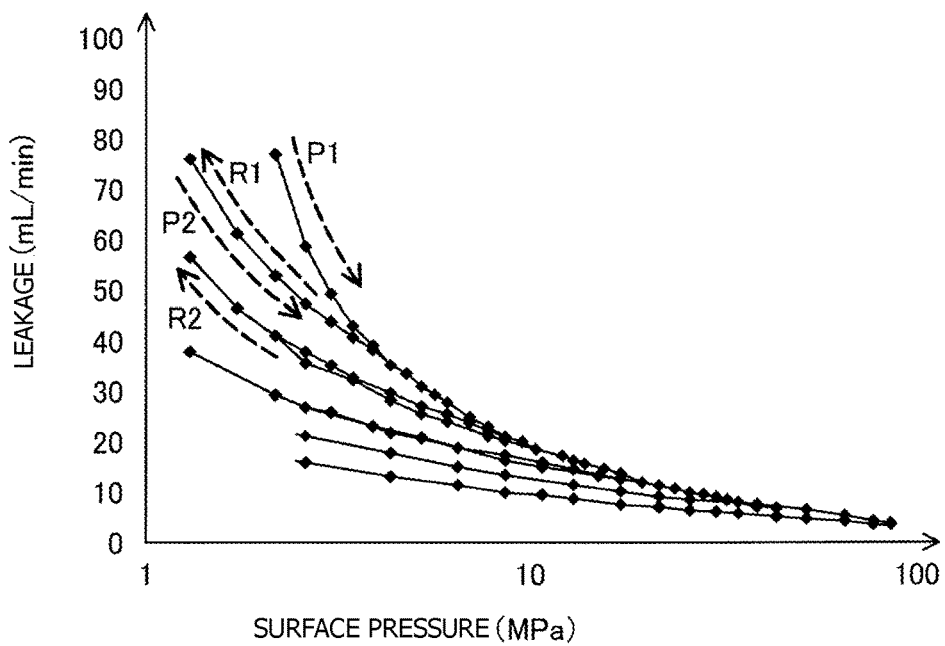
FIG. 18 Explanatory view showing the hysteresis property of a mica sheet MS.

The mica sheet MS has hysteresis property; i.e., when a compressive force is applied to the mica sheet MS and then the force is released, the mica sheet MS is not returned to the original state before application of the compressive force. Thus, once a preload is applied to the mica sheet MS, the mica sheet MS maintains a desired undulation Pa even after release of the preload. Hence, the gas sealing performance of the cathode-side frame 130 can be improved if the cathode-side frame 130 is formed from the mica sheet MS to which a preload has been applied. FIG. 18 is an explanatory view showing the hysteresis property of the mica sheet MS. FIG. 18 illustrates the results of measurement of gas leakage (mL/min) in the case of repeated compression and release of the mica sheet MS. As shown in FIG. 18, when the surface pressure applied to the mica sheet MS is increased (P1), the gas leakage decreases. When the surface pressure applied to the mica sheet MS is decreased (R1) after that, the gas leakage increases; however, the gradient of increase in the gas leakage is smaller than that during the preceding increase in the surface pressure (P1). Similarly, when the surface pressure applied to the mica sheet MS is increased after that (P2), the gas leakage decreases at a gradient approximately equal to that during the preceding decrease in the surface pressure (R1). When the surface pressure applied to the mica sheet MS is decreased (R2), the gas leakage increases; however, the gradient of increase in the gas leakage is smaller than that during the preceding increase in the surface pressure (P2). Since the mica sheet MS has hysteresis property as described above, the gas sealing performance of the cathode-side frame 130 can be improved if the cathode-side frame 130 is formed from the mica sheet MS to which a preload has been applied.

Figure 19:
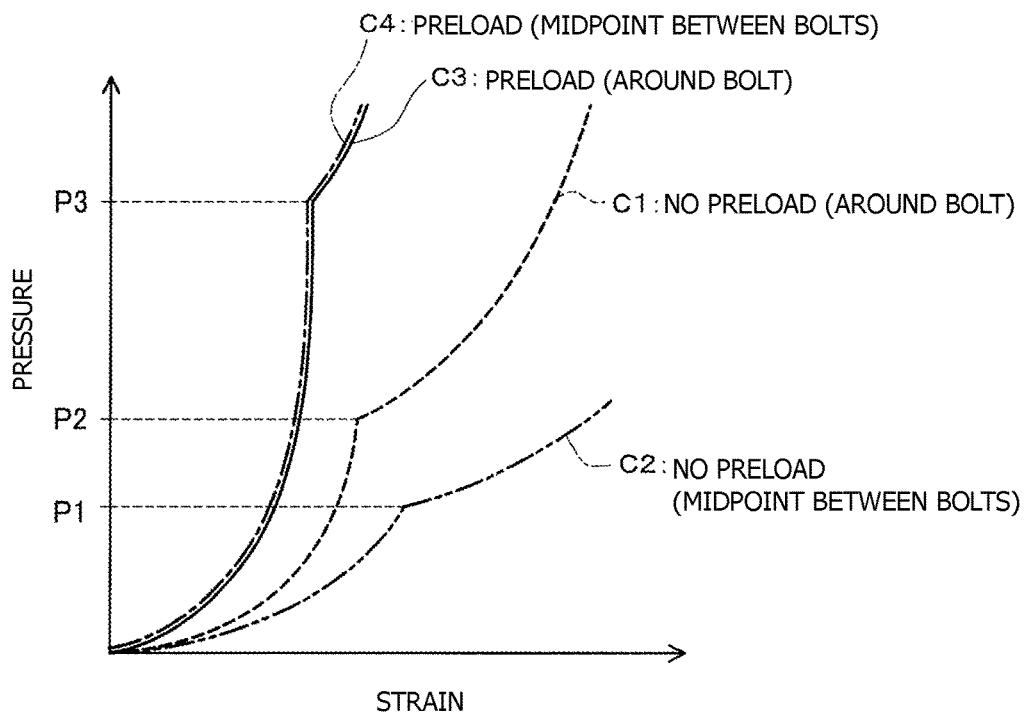
FIG. 19 Explanatory view showing a method for determining the presence or absence of a preload applied to the mica sheet MS.

The hysteresis property of the mica sheet MS can be used for determining whether or not a preload is applied to the cathode-side frame 130 included in the fuel cell stack 100 and formed of the mica sheet MS. FIG. 19 is an explanatory view showing a method for determining the presence or absence of a preload applied to the mica sheet MS. FIG. 19 illustrates the relationship between the strain of the mica sheet MS and the pressure applied thereto. A curve C1 indicates the property of a mica sheet MS determined around a bolt 22, the mica sheet MS being removed from the fuel cell stack 100 that is produced without application of a preload to the mica sheet MS. A curve C2 indicates the property of the mica sheet MS to which no preload is applied and which is determined around the midpoint between bolts 22. A curve 3 indicates the property of a mica sheet MS determined around a bolt 22, the mica sheet MS being removed from the fuel cell stack 100 that is produced with application of a preload to the mica sheet MS. A curve C4 indicates the property of the mica sheet MS to which the preload is applied and which is determined around the midpoint between bolts 22.

In general, the mica sheet MS tends to exhibit large strain in association with an increase in pressure applied thereto. Since the mica sheet MS has hysteresis property, the mica sheet MS exhibits a drastic increase in strain relative to an increase in pressure when the pressure exceeds the level previously applied to the mica sheet MS. This point of change (drastic increase) corresponds to the inflection point of each curve.

In the case of the mica sheet MS without application of a preload, the fastening load is the maximum load previously applied to the mica sheet MS. In this case, the fastening load P2 applied to the mica sheet MS around the bolt 22 is greater than the fastening load P1 applied to the mica sheet MS around the midpoint between the bolts 22. Thus, the pressure P2 at the inflection point of the curve C1 is greater than the pressure P1 at the inflection point of the curve C2. The curve C1 differs from the curve C2 in terms of compression property until the inflection point. Therefore, it can be determined that no preload is applied to the mica sheet MS if the pressure at the inflection point or the compression property until the inflection point differs between the position around the bolt 22 and the position around the midpoint between the bolts 22 in the mica sheet MS removed from the fuel cell stack 100.

In the case of the preload-applied mica sheet MS, the preload P3 is the maximum load previously applied thereto at both the position around the bolt 22 and the position around the midpoint between the bolts 22. Thus, the pressure (P3) at the inflection point of the curve C3 falls within a ±20% range of the pressure (P3) at the inflection point of the curve C4. Also, the compression property until the inflection point of the curve C3 falls within a ±20% range of the compression property until the inflection point of the curve C4. Therefore, it can be determined that a preload has been applied to the mica sheet MS if the mica sheet MS removed from the fuel cell stack 100 is such that the pressure at the inflection point or the compression property until the inflection point measured at the position around the bolt 22 is in a ±20% range of that measured at the position around the midpoint between the bolts 22 and the pressure at the inflection point or the compression property until the inflection point measured at the position around the midpoint between the bolts 22 is in a ±20% range of that measured at the position around the bolt 22.

As described above, the method for producing the fuel cell stack 100 of the present embodiment includes a step of polishing the mica sheet MS. The formation of the cathode-side frame 130 from the polished mica sheet MS can decrease the surface roughness Ra of the cathode-side frame 130 to 3.0 (μm) or less. Thus, the leakage of a gas from the cathode chamber 166 through the surface of the cathode-side frame 130 can be effectively prevented; i.e., the gas sealing performance of the cathode-side frame 130 can be improved.

The method for producing the fuel cell stack 100 of the present embodiment also includes a compression step of applying a preload to the mica sheet MS. Since the mica sheet MS has hysteresis property, the application of a preload to the mica sheet MS can reduce the undulation Pa of the cathode-side frame 130 formed of the mica sheet MS and a variation in undulation Pa thereof. Specifically, the average of the undulation Pa of the cathode-side frame 130 can be decreased to 1.4 (μm) or less, and the standard deviation of undulation Pa of the cathode-side frame 130 can be decreased to 0.2 or less. Thus, the undulation Pa of the cathode-side frame 130 and a variation in undulation Pa can be reduced, and the leakage of a gas from the cathode chamber 166 through the surface of the cathode-side frame 130 can be more effectively prevented; i.e., the gas sealing performance of the cathode-side frame 130 can be further improved. The average of the undulation Pa of the cathode-side frame 130 and the standard deviation of undulation Pa are calculated on the basis of the results of measurement at any five measurement lines ML on the cathode-side frame 130.

The application of a preload to the mica sheet MS can also reduce the porosity of the cathode-side frame 130 formed of the mica sheet MS. Thus, the leakage of a gas from the cathode chamber 166 through the interior portion of the cathode-side frame 130 can be more effectively prevented; i.e., the gas sealing performance of the cathode-side frame 130 can be further improved.

In the method for producing the fuel cell stack 100 of the present embodiment, the compression step is performed after the thermal treatment step. Thus, even if the porosity of the mica sheet MS is increased by the thermal treatment step through decomposition or evaporation of, for example, a binder contained in the mica sheet MS, the porosity thereof can be reduced by the subsequent compression step, and the leakage of a gas from the cathode chamber 166 through the interior portion of the cathode-side frame 130 can be more effectively prevented.

In the method for producing the fuel cell stack 100 of the present embodiment, the preload applied to the mica sheet MS in the compression step is greater than the fastening load. Thus, the compression step can more effectively reduce the undulation Pa of the cathode-side frame 130, a variation in undulation Pa thereof, and the porosity thereof. Hence, the leakage of a gas from the cathode chamber 166 through the surface or interior portion of the cathode-side frame 130 can be more effectively prevented.

B. Modifications

The technique disclosed in the present specification is not limited to the above embodiments, but may be modified into various other forms without departing from the gist thereof. For example, the technique may be modified as described below.

In the above embodiments, the cathode-side frame 130 (mica sheet MS) is polished for decreasing the surface roughness Ra of the cathode-side frame 130 to 3.0 (μm) or less. However, another production method may be used for decreasing the surface roughness Ra of the cathode-side frame 130 to 3.0 (μm) or less. If the surface roughness Ra of the cathode-side frame 130 is decreased to 3.0 (μm) or less by any production method, the leakage of a gas from the cathode chamber 166 through the surface of the cathode-side frame 130 can be effectively prevented; i.e., the gas sealing performance of the cathode-side frame 130 can be improved.

Similarly, in the above embodiments, a preload is applied to the cathode-side frame 130 (mica sheet MS) for decreasing the standard deviation of undulation Pa of the cathode-side frame 130 to 0.2 or less and decreasing the average of the undulation Pa thereof to 1.4 (μm) or less. However, another production method may be used for decreasing the standard deviation of undulation Pa of the cathode-side frame 130 to 0.2 or less and decreasing the average of the undulation Pa thereof to 1.4 (μm) or less. If the standard deviation of undulation Pa of the cathode-side frame 130 is decreased to 0.2 or less or the average of the undulation Pa thereof is decreased to 1.4 (μm) or less by any production method, the undulation Pa of the cathode-side frame 130 and a variation in undulation Pa can be reduced, and the leakage of a gas from the cathode chamber 166 through the surface of the cathode-side frame 130 can be more effectively prevented; i.e., the gas sealing performance of the cathode-side frame 130 can be further improved.

In the above embodiments, the preload is greater than the fastening load. However, the preload may be equal to or smaller than the fastening load. The preload is preferably adjusted to be greater than the fastening load, since the undulation Pa of the cathode-side frame 130, a variation in undulation Pa, and the porosity can be more effectively reduced.

In the above embodiments, the mica sheet MS is subjected to thermal treatment. However, the thermal treatment is not necessarily performed.

In the above embodiments, the cathode-side frame 130 is formed of mica. However, the cathode-side frame may be formed of a material other than mica, such as vermiculite, Thermiculite, or alumina felt.

In the above embodiments, the surface roughness Ra and undulation Pa of the cathode-side frame 130 that seals the cathode chamber 166 have been described, and the polishing and preload during formation of the cathode-side frame 130 have also been described. In the case where the sealing of the anode chamber 176 is achieved with the compression sealing by the anode-side frame 140, the gas sealing of the anode chamber 176 by means of the anode-side frame 140 can be improved through control of the surface roughness Ra and undulation Pa of the anode-side frame 140 (in addition to or instead of the cathode-side frame 130) and the polishing and preload during formation of the anode-side frame 140 by using the same configuration and production method as those used in the above embodiments. A sealing member may be provided separately from the cathode-side frame 130 and the anode-side frame 140, and the surface roughness Ra and undulation Pa of the sealing member and the polishing and preload during formation of the sealing member may be controlled by using the same configuration and production method as those used in the above embodiments. In order to improve the gas sealing performance by means of the sealing member, two members (e.g., the separator 120 and the interconnector 150) that sandwich the sealing member (e.g., the cathode-side frame 130) preferably have a surface with no large irregularities (i.e., an approximately flat surface). For example, the two members sandwiching the sealing member have a surface roughness Ra of preferably 2.0 μm or less, more preferably 1.0 μm or less, still more preferably 0.5 μm or less. The surface roughness Ra of the two members sandwiching the sealing member can be measured as specified in JIS B 0601:2013 as in the case of the surface roughness Ra of the sealing member described above.

In the above embodiments, the number of the electricity generation units 102 included in the fuel cell stack 100 is a mere example and is determined as appropriate in accordance with, for example, a required output voltage of the fuel cell stack 100.

In the above embodiments, the position of the heat exchange member 103 in the fuel cell stack 100 in the direction of array is a mere example, and the heat exchange member 103 may be disposed at any position. Preferably, the heat exchange member 103 is disposed adjacent to the electricity generation unit 102 whose temperature becomes higher in all the electricity generation units 102 included in the fuel cell stack 100, in order to moderate the heat distribution of the fuel cell stack 100 in the direction of array. For example, if the electricity generation unit 102 around the center (in the direction of array) of the fuel cell stack 100 is likely to exhibit a higher temperature, the heat exchange member 103 is preferably disposed around the center (in the direction of array) of the fuel cell stack 100 as in the case of the aforementioned embodiments. The fuel cell stack 100 may include two or more heat exchange members 103.

In the above embodiments, the heat exchange member 103 is adapted to increase the temperature of the oxidizer gas OG. However, the heat exchange member 103 may be adapted to increase the temperature of the fuel gas FG instead of the oxidizer gas OG, or may be adapted to increase the temperatures of the oxidizer gas OG and the fuel gas FG.

In the above embodiments, the nut 24 is engaged with each of opposite ends of the bolt 22. However, the bolt 22 may have a head, and the nut 24 may be engaged with only an end opposite the head of the bolt 22.

In the above embodiments, the end plates 104 and 106 function as output terminals. However, other members connected respectively to the end plates 104 and 106 (e.g., electrically conductive plates disposed respectively between the end plate 104 and the electricity generation unit 102 and between the end plate 106 and the electricity generation unit 102) may function as output terminals.

In the above embodiments, spaces between the outer circumferential surfaces of shaft portions of the bolts 22 and the inner circumferential surfaces of the communication holes 108 are utilized as manifolds. However, axial holes may be formed in the shaft portions of the bolts 22 for use as the manifolds. Also, the manifolds may be provided separately from the communication holes 108 into which the bolts 22 are inserted.

In the above embodiments, in the case where two electricity generation units 102 are disposed adjacent to each other, the adjacent two electricity generation units 102 share a single interconnector 150. However, even in such a case, two electricity generation units 102 may have respective interconnectors 150. Also, in the above embodiments, the uppermost electricity generation unit 102 in the fuel cell stack 100 does not have the upper interconnector 150, and the lowermost electricity generation unit 102 in the fuel cell stack 100 does not have the lower interconnector 150. However, these interconnectors 150 may be provided without elimination.

In the above embodiments, the anode-side current collector 144 may have a structure similar to that of the cathode-side current collector 134; i.e., the anode-side current collector 144 and the adjacent interconnector 150 may be integrally formed as a unitary member. The anode-side frame 140 rather than the cathode-side frame 130 may be an insulator. Also, the cathode-side frame 130 and the anode-side frame 140 may have a multilayer structure.

In the above embodiments, materials used to form the members are provided merely by way of example. Other materials may be used to form the members.

In the above embodiments, the hydrogen-rich fuel gas FG is obtained by reforming city gas. However, the fuel gas FG may be obtained from other materials, such as LP gas, kerosene, methanol, and gasoline, or pure hydrogen may be utilized as the fuel gas FG.

In the above embodiments, for example, a reaction preventing layer containing ceria may be provided between the electrolyte layer 112 and the cathode 114 for preventing an increase in electric resistance between the electrolyte layer 112 and the cathode 114 caused by reaction of zirconium or a similar component contained in the electrolyte layer 112 with strontium or a similar component contained in the cathode 114. In the present specification, the expression "B and C face each other with A intervening therebetween" is not necessarily limited to a structure in which A is adjacent to B or C, but includes a structure in which another component element intervenes between A and B or between A and C. For example, a structure in which a reaction preventing layer intervenes between the electrolyte layer 112 and the cathode 114 can be said to be a structure in which the cathode 114 and the anode 116 face each other with the electrolyte layer 112 intervening therebetween.

The above embodiments are described while referring to the solid oxide fuel cell (SOFC); however, the present invention is also applicable to other types of fuel cells, such as a polymer electrolyte fuel cell (PEFC), a phosphoric-acid fuel cell (PAFC), and a molten carbonate fuel cell (MCFC).

DESCRIPTION OF REFERENCE NUMERALS

22: bolt; 24: nut; 26: insulation sheet; 27: gas passage member; 28: body portion; 29: branch portion; 100: fuel cell stack; 102: electricity generation unit; 103: heat exchange member; 104: end plate; 106: end plate; 108: communication hole; 110: single cell; 112: electrolyte layer; 114: cathode; 116: anode; 120: separator; 121: hole; 124: bonding member; 130: cathode-side frame; 131: hole; 132: oxidizer gas supply communication hole; 133: oxidizer gas discharge communication hole; 134: cathode-side current collector; 140: anode-side frame; 141: hole; 142: fuel gas supply communication hole; 143: fuel gas discharge communication hole; 144: anode-side current collector; 145: electrode facing portion; 146: interconnector facing portion; 147: connection portion; 149: spacer; 150: interconnector; 161: oxidizer gas introduction manifold; 162: oxidizer gas discharge manifold; 163: oxidizer gas supply manifold; 166: cathode chamber; 171: fuel gas introduction manifold; 172: fuel gas discharge manifold; 176: anode chamber; 182: hole; 184: communication hole; 186: communication hole; 188: heat exchange flow channel; 500: test apparatus; 510: jig; 512: gas supply tube; 514: surface; 516: opening; 520: jig; 522: gas discharge tube; 524: surface; 526: opening

The invention claimed is:

1. A fuel cell stack comprising:
a plurality of electricity generation units disposed in a first direction; and
a plurality of fastening members extending in the first direction, the fuel cell stack being fastened by means of the fastening members and being characterized in that each of the electricity generation units comprises:
a single cell including an electrolyte layer, and a cathode and an anode which face each other in the first direction with the electrolyte layer intervening therebetween, and
a sealing member having a through hole defining one of an anode chamber facing the anode and a cathode chamber facing the cathode, the sealing member being sandwiched between two other members in the first direction, thereby sealing the one of the anode chamber and the cathode chamber; and the surface of the sealing member included in at least one of the electricity generation units, the surface facing either of the two other members, has a surface roughness Ra of 3.0 µm or less, the sealing member has a hysteresis property, and with regard to an inflection point at a curve representing a relationship between pressure applied to the sealing member and strain arising from the sealing member, in the sealing members, a value of the pressure of the inflection point at a position around one fastening member of the plurality of fastening members and a value of the pressure of the inflection point at a position around a midpoint of the other fastening member adjacent to the one fastening member are a value of ±20%.

2. The fuel cell stack according to claim 1, wherein the surface of the sealing member included in at least one of the electricity generation units, the surface facing either of the two other members, exhibits a standard deviation of undulation Pa of 0.2 or less.

3. The fuel cell stack according to claim 2, wherein the surface of the sealing member facing either of the two other members has an average undulation Pa of 1.4 µm or less.

4. A method for producing the fuel cell stack according to claim 1, the fuel cell stack comprising a single cell including an electrolyte layer, and a cathode and an anode which face each other in a first direction with the electrolyte layer intervening therebetween; and a sealing member having a through hole defining one of an anode chamber facing the anode and a cathode chamber facing the cathode, the sealing member being sandwiched between two other members in the first direction, thereby sealing the one of the anode chamber and the cathode chamber, the single cell and the sealing member being disposed in the first direction and fastened by means of a plurality of fastening members extending in the first direction, the method being characterized by comprising:

a compression step of applying a compressive load to the sealing member having a hysteresis property;

an assembly step of fastening a plurality of the single cells and a plurality of the sealing members by means of the plurality of fastening members after the compression step, and a compressive load in the compression step is, with regard to an inflection point at a curve representing a relationship between pressure applied to the sealing member and strain arising from the sealing member, in the sealing members, such a compressive load that a value of the pressure of the inflection point at a position around one fastening member of the plurality of fastening members and a value of the pressure of the inflection point at a position around a midpoint of other fastening member adjacent the one fastening member are a value of ±20%.

5. The method for producing a fuel cell stack according to claim 4, the method further comprising:

a thermal treatment step of heating the sealing member before the compression step.

6. The method for producing a fuel cell stack according to claim 4, wherein the compressive load per unit area of the sealing member in the compression step is greater than the load per unit area applied to the sealing member through fastening of the fuel cell stack by means of the fastening members at the completion of the assembly step.

7. The method for producing a fuel cell stack according to claim 5, wherein the compressive load per unit area of the sealing member in the compression step is greater than the load per unit area applied to the sealing member through fastening of the fuel cell stack by means of the fastening members at the completion of the assembly step.

* * * * *